United States Patent
Mukohara

(10) Patent No.: US 9,964,011 B2
(45) Date of Patent: May 8, 2018

(54) POWER UNIT FOR VEHICLE

(71) Applicant: HONDA MOTOR CO., LTD., Minato-ku (JP)

(72) Inventor: Hodaka Mukohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/454,503

(22) Filed: Mar. 9, 2017

(65) Prior Publication Data

US 2017/0276038 A1 Sep. 28, 2017

(30) Foreign Application Priority Data

Mar. 28, 2016 (JP) .................................. 2016-063190

(51) Int. Cl.
*F01M 11/03* (2006.01)
*F01M 1/10* (2006.01)
*B01D 29/03* (2006.01)
*B01D 35/00* (2006.01)
*B01D 35/30* (2006.01)
(Continued)

(52) U.S. Cl.
CPC ............. *F01M 11/03* (2013.01); *B01D 29/03* (2013.01); *B01D 35/005* (2013.01); *B01D 35/306* (2013.01); *F01M 1/10* (2013.01); *F01M 11/0004* (2013.01); *F02B 61/02* (2013.01); *H02K 7/1815* (2013.01); *F01M 2001/105* (2013.01); *F01M 2011/007* (2013.01); *F16N 2039/007* (2013.01)

(58) Field of Classification Search
CPC ..... F01M 2011/0029; F01M 2011/031; F01M 2011/035; F01M 11/03; F01M 11/10; F01M 11/0004; F01M 1/10; F01M 2001/105; F01M 2001/1071; F01M 2011/007; H02K 7/1815; B01D 35/005; B01D 35/306; B01D 35/30; B01D 29/03; B01D 29/031; B01D 29/036; B01D 29/038; F02B 61/02; F16N 2039/007
USPC .... 123/196 R, 196 A, 196 CP, 196 M, 198 E
See application file for complete search history.

(56) References Cited

U.S. PATENT DOCUMENTS 4,702,204 A * 10/1987 Anno ....................... F01M 5/00
 123/196 AB
5,363,823 A * 11/1994 Gittlein ................... F01M 5/002
 123/196 AB
(Continued)

FOREIGN PATENT DOCUMENTS

JP 2009-121325 A 6/2009

*Primary Examiner* — Lindsay Low
*Assistant Examiner* — George Jin
(74) *Attorney, Agent, or Firm* — Squire Patton Boggs (US) LLP

(57) ABSTRACT

A power unit including an internal combustion engine has an electric power generator mounted on an end of a crankshaft, a power transmitting member mounted on the other end of the crankshaft, and a lubricant oil filter. The oil filter partly overlaps the electric power generator as viewed in the direction of a crankshaft axis, and is positioned between the electric power generator and a crank weight on the crankshaft with respect to the direction of the crankshaft axis. The oil filter has a filter mount axis forming an acute angle to the crankshaft axis. The engine crankcase is thus prevented from bulging outwardly, and the power unit is reduced in size in its entirety.

6 Claims, 17 Drawing Sheets

(51) Int. Cl.
*H02K 7/18* (2006.01)
*F02B 61/02* (2006.01)
*F01M 11/00* (2006.01)
*F16N 39/00* (2006.01)

(56) References Cited

U.S. PATENT DOCUMENTS

| | | | | |
|---|---|---|---|---|
| 5,887,565 | A * | 3/1999 | Ozeki | F01M 11/02 123/196 R |
| 6,305,337 | B1 * | 10/2001 | Sumi | F01L 1/02 123/179.25 |
| 6,488,848 | B1 * | 12/2002 | Smith | B01D 29/114 210/301 |
| 7,353,792 | B2 * | 4/2008 | Oda | B62M 25/04 123/195 AC |
| 2001/0017120 | A1 * | 8/2001 | Ozeki | F01L 1/02 123/196 R |
| 2005/0107194 | A1 * | 5/2005 | Oishi | F01M 11/02 474/28 |
| 2009/0026000 | A1 * | 1/2009 | Nakamura | B60K 5/04 180/291 |
| 2010/0230212 | A1 * | 9/2010 | Jensen | B01D 35/027 184/6.24 |

* cited by examiner

POWER UNIT FOR VEHICLE

TECHNICAL FIELD

The present invention relates to a power unit for a vehicle with a lubricant oil filter attached thereto.

BACKGROUND ART

In a conventional vehicle power unit including an internal combustion engine with an electric power generator and a lubricant oil filter attached to the body of the engine, the oil filter is disposed outwardly of the outer periphery of the electric power generator that is mounted on the crankshaft (see Patent Document 1).

Such a vehicle power unit has a problem in that it tends to be large in size because its crankcase is enlarged outwardly by the lubricant oil filter protruding outwardly of the outer periphery of the electric power generator.

PRIOR ART DOCUMENT

Patent Document

[Patent Document 1]
JP2009-121325 A

SUMMARY OF THE INVENTION

Problem to be Solved by the Invention

The present invention has been made in order to overcome the above problem. It is an object of the present invention to provide a power unit including an internal combustion engine wherein an electric power generator and a lubricant oil filter are disposed in a compact layout and the engine crankcase is prevented from bulging outwardly, whereby the power unit is reduced in size in its entirety.

Means for Solving the Problem

To attain the above object, according to the present invention, there is provided a power unit including an internal combustion engine having a crankshaft with a crank weight, an electric power generator mounted on an end of the crankshaft, a power transmitting member mounted on another end of the crankshaft, for outputting power from the crankshaft, and a lubricant oil filter; wherein:
the oil filter includes an oil filter casing and a tubular layered filter body in the oil filter casing, the oil filter partly overlapping the electric power generator as viewed in a direction along an axis of the crankshaft and being positioned between the electric power generator and the crank weight on the crankshaft with respect to a direction along the axis of the crankshaft; and the oil filter is disposed to have a filter mount axis forming an acute angle to the axis of the crankshaft.

In the power unit according to the present invention, the oil filter, containing the tubular layered filter paper body, partly overlaps the electric power generator as viewed in the direction of the crankshaft axis, and is positioned between the electric power generator and the crank weight on the crankshaft in a direction along the crankshaft axis, and the oil filter has the filter mount axis forming an acute angle to the crankshaft axis. Therefore, the electric power generator and the oil filter are disposed in a compact layout and a crankcase is prevented from bulging outwardly, making the power unit reduced in size in its entirety.

In a preferred embodiment of the invention, the oil filter includes a replaceable filter element having a pair of plate-like members covering respective opposite ends of the tubular layered filter paper body; one of the plate-like members has an oil outlet formed centrally therein; the internal combustion engine has a crankcase formed with a filter casing mounting seat and an oil passage seat positioned inside the filter casing mounting seat; and a spring is interposed between the oil filter casing and the replaceable filter element, for normally urging the replaceable filter element to be pressed against the crankcase and held in position on the crankcase, the oil filter casing being fastened to the filter casing mounting seat of the crankcase by fasteners disposed around the oil filter casing.

With the power unit thus arranged, the oil filter include an inexpensive replaceable filter element, and hence can be reduced in cost, and can be assembled and maintained with ease.

In a further preferred embodiment of the invention, the electric power generator has a generator cover; the oil filter casing is disposed such that the oil filter casing and the generator cover covering the electric power generator partly overlap each other as viewed in the direction along the axis of the crankshaft; and the generator cover has a recess formed therein to clear the oil filter.

With the power unit thus arranged, the oil filter and the electric power generator can be disposed closely to each other, and any oil leakage and seepage from the oil filter casing can easily be confirmed for better maintenance and inspection.

In a still further preferred embodiment of the invention, the fasteners by which the oil filter casing and the crankcase are fastened to each other underlie the generator cover and are behind the generator cover, as viewed in the direction of the axis of the crankshaft.

With the power unit thus arranged, the fasteners of the oil filter casing is protected by the generator cover and prevented from being dislodged.

In another preferred embodiment of the invention, the oil filter casing is so disposed obliquely with respect to the axis of the crankshaft as to be positioned above a line interconnecting an outer edge of the generator cover and an outer side edge of a lower portion of the crankcase.

With the power unit thus arranged, the oil filter is prevented from adversely affecting the banking angle of a motorcycle on which the power unit is mounted, and the banking angle can be increased.

In an embodiment of the invention, the power unit has transmission gear shafts including a main shaft and a countershaft both extending parallel to the crankshaft, a clutch device mounted on an end of the main shaft, and a clutch lifter lever shaft operable on another end of the main shaft for engaging and disengaging the clutch device; the oil filter is disposed below the clutch lifer lever shaft; and an oil strainer for cleaning oil to be sent to an oil pump is disposed below and adjacent to the oil filter.

With the power unit thus arranged, as the oil filter is disposed closely to the electric power generator, the clutch lifter lever shaft can be disposed in a space behind the electric power generator, the oil filter can be disposed below the clutch lifter lever shaft, and the oil strainer through which oil flows from the oil reservoir into the oil pump can be disposed below the oil filter in the vicinity thereof. The oil reservoir in which the oil strainer is disposed can be placed at a high position, ensuring a minimum vehicle height from the ground.

Effect of the Invention

In the power unit according to the present invention, the electric power generator and the oil filter are disposed in a compact layout and the crankcase is prevented from bulging outwardly, whereby the power unit is reduced in size in its entirety.

MODE FOR CARRYING OUT THE INVENTION

Figure 1:
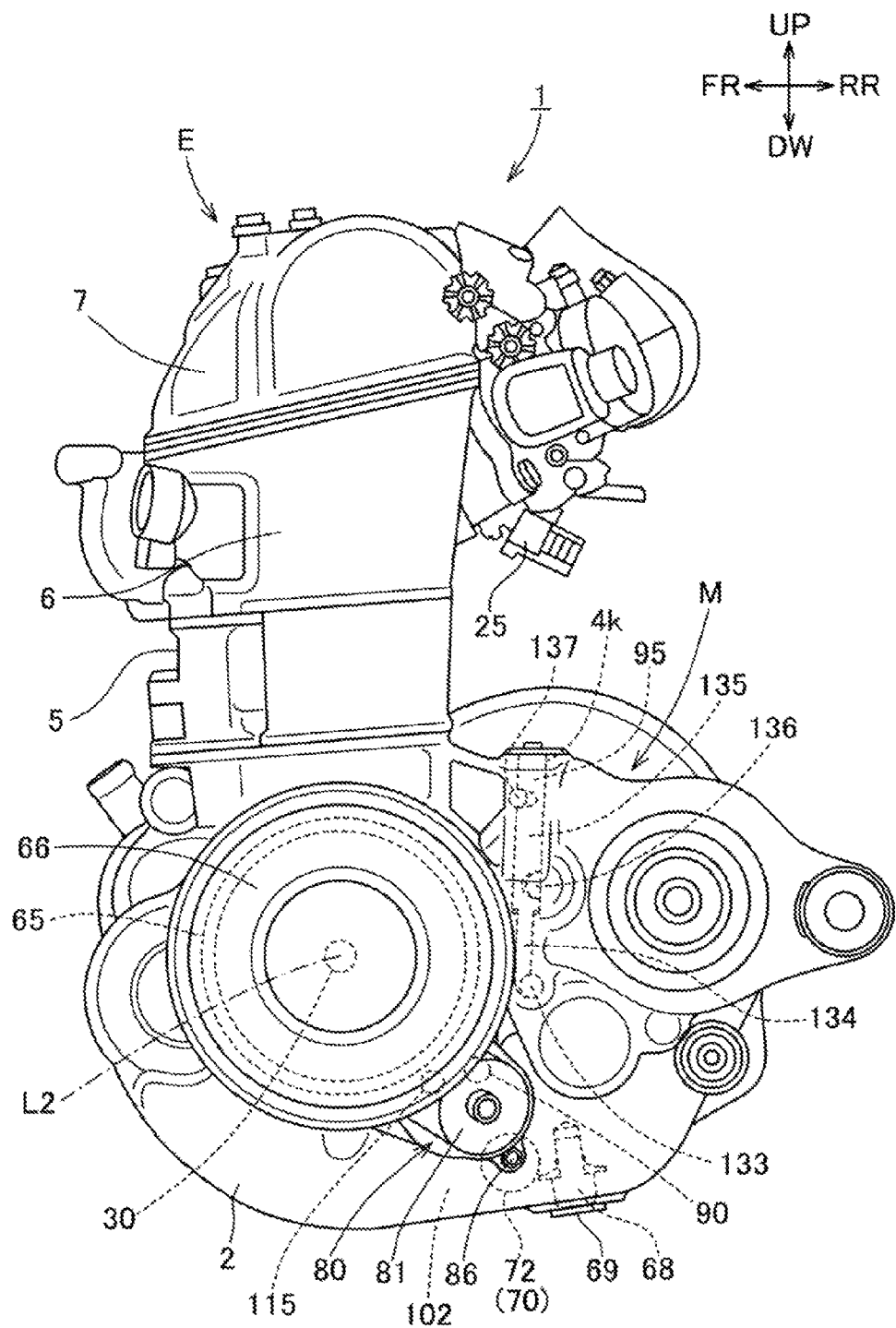
FIG. 1 is a left-hand side elevational view of a power unit according to an embodiment of the present invention.

A power unit for a vehicle according to an embodiment of the present invention will be described below with reference to the drawings. The power unit, generally designated by 1, includes an internal combustion engine E and a transmission M integrally combined with a rear portion of the internal combustion engine E, and is installed on a motorcycle, not shown. Directions such as forward, rearward, leftward, rightward, upward and downward directions, for example, and other directional expressions referred to in the description below shall be in accord with those according to ordinary standards with respect to a motorcycle incorporating the power unit according to the present embodiment where the direction in which the motorcycle moves straight ahead is referred to as the forward direction. In the drawings, the reference symbol FR represent a forward direction of the motorcycle, the reference symbol RR a rearward direction of the motorcycle, the reference symbol LH a leftward direction of the motorcycle, and the reference symbol RH a rightward direction of the motorcycle.

Figure 2:
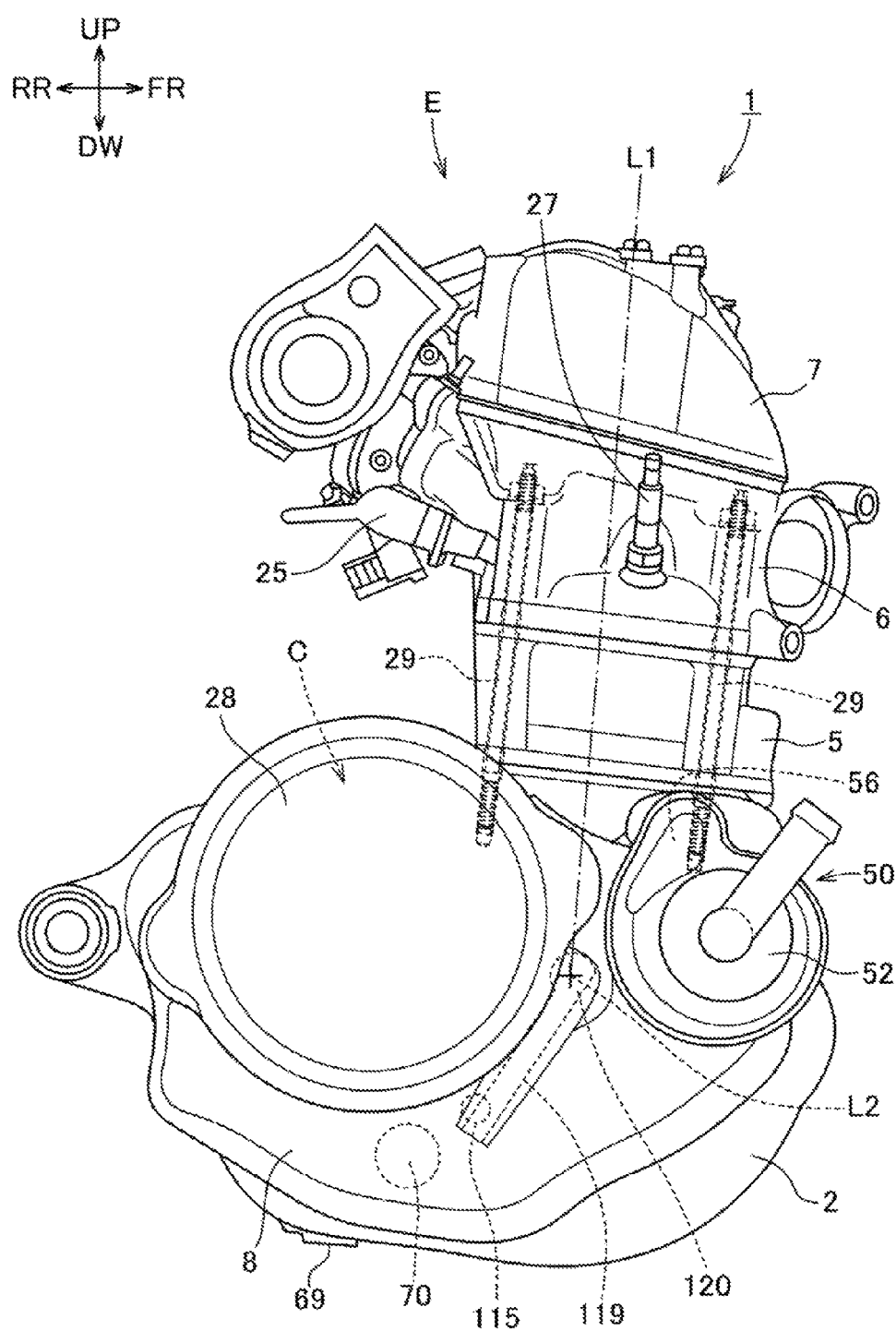
FIG. 2 is a right-hand side elevational view of the power unit.
Figure 3:
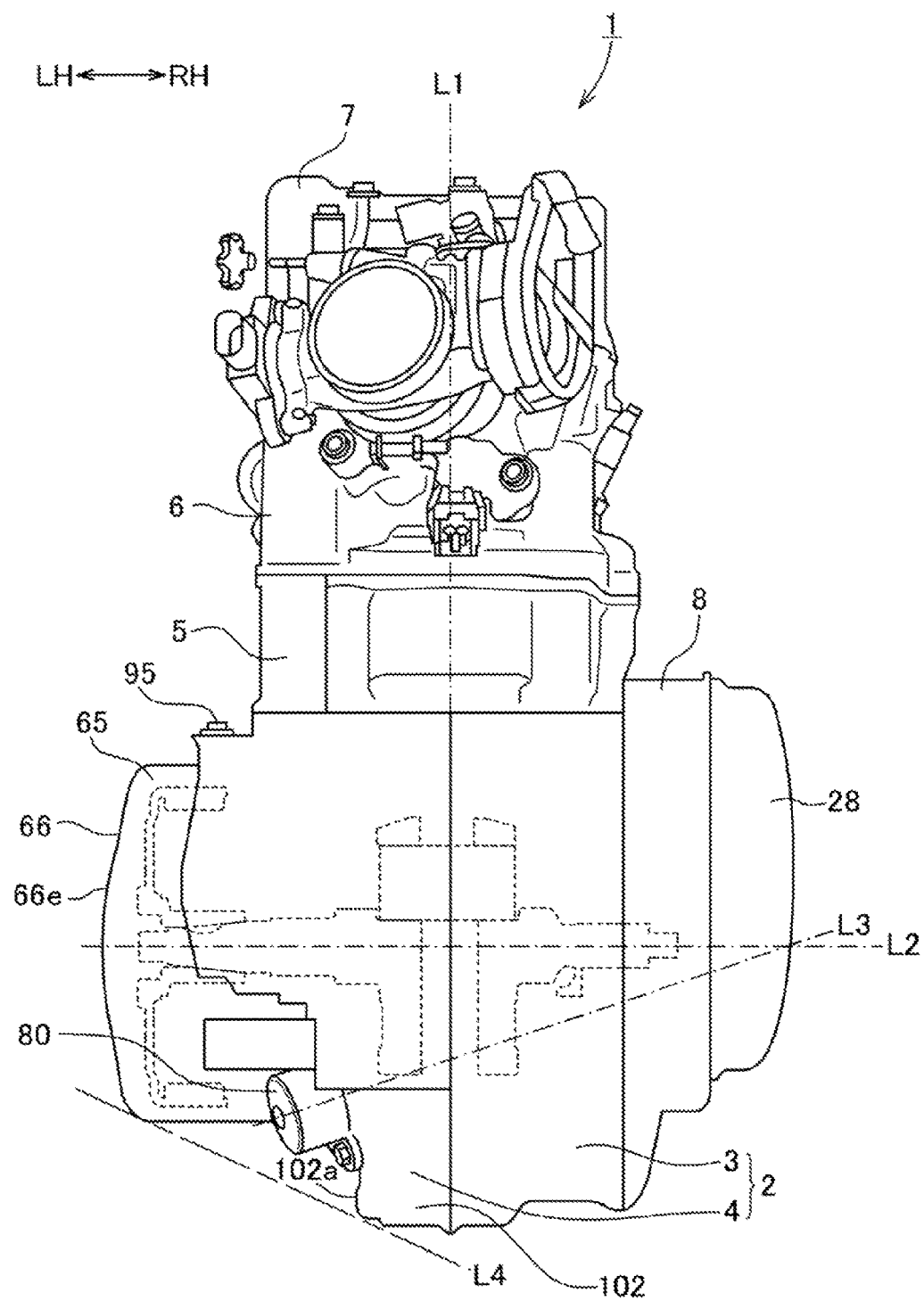
FIG. 3 is a rear elevational view of the power unit.

As shown in FIGS. 1 through 3, the power unit 1 according to the present embodiment includes the internal combustion engine E which is a water-cooled single-cylinder four-stroke engine. The power unit 1 has a split crankcase 2 divided along a crankshaft axis L2 into two left and right crankcase members, i.e., a left crankcase member 4 and a right crankcase member 3.

On the crankcase 2, there are superposed a cylinder body 5 having a cylinder 10 (see FIG. 14) and a cylinder head 6 that are successively stacked upwardly and integrally fastened together by stud bolts 29. The cylinder head 6 has an upper end covered with a cylinder head cover 7. The right crankcase member 3 has a right side surface covered with a right crankcase cover 8. A clutch cover 28 and a water pump cover 52 are mounted on the right crankcase cover 8. The left crankcase member 4 has an outer side surface, i.e., a left side surface, on which there is mounted a generator cover 66 that covers an electric power generator 65. The power unit 1 is installed on the motorcycle, not shown, in such an attitude that the internal combustion engine E has a crankshaft 30 oriented along the transverse directions of the motorcycle and the cylinder 10 has a central axis, i.e., a cylinder axis L1, slightly inclined forwardly.

Figure 14:
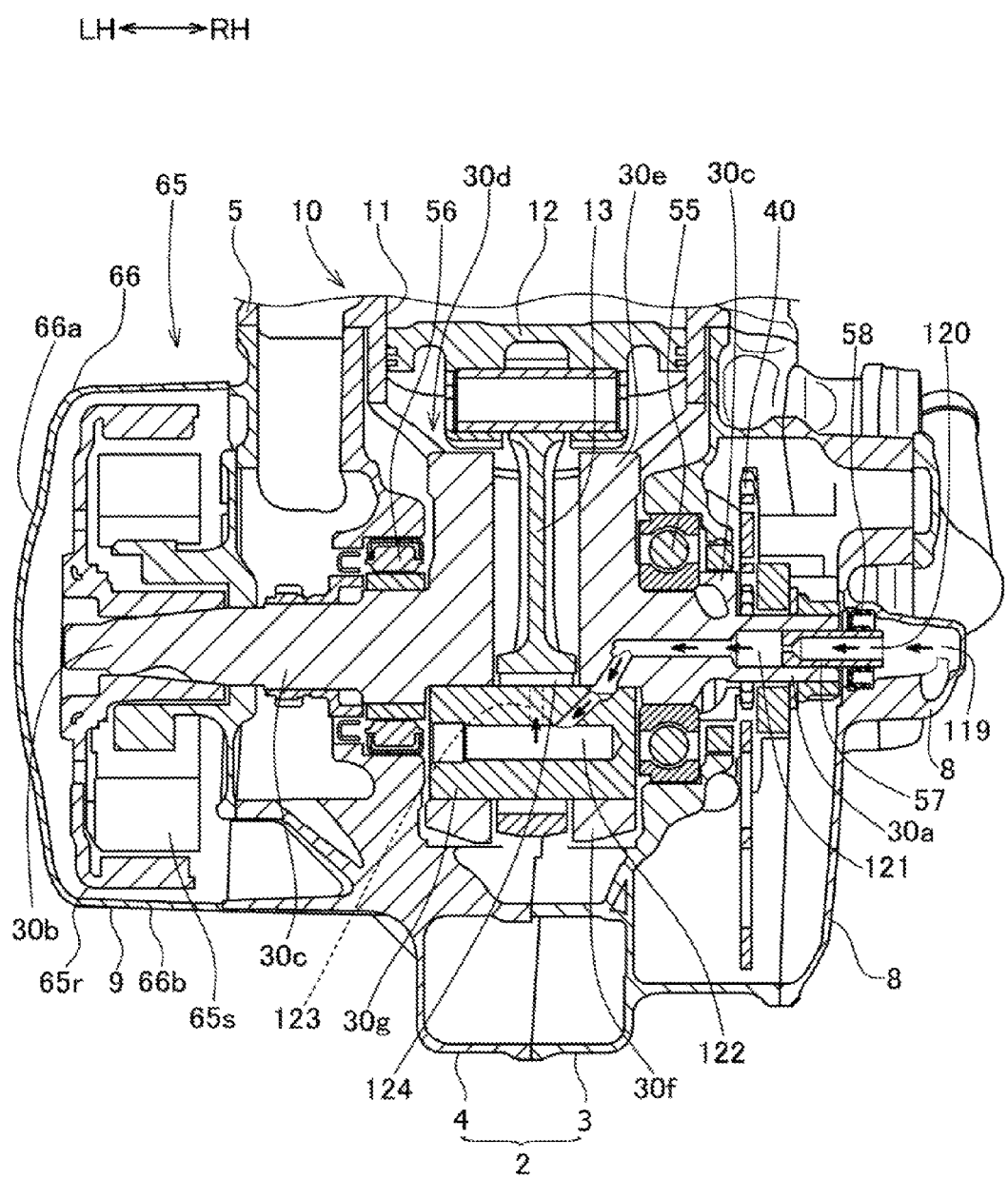
FIG. 14 is a fragmentary vertical cross-sectional view of the power unit, taken along a plane extending through the axis of a crankshaft.

As shown in FIG. 14, the crankshaft 30 includes right and left crank journals 30c supported respectively by the left crankcase member 4 and the right crankcase member 3, and a crank web 30d joined to the crank journals 30c and including a pair of crank weights 30e and a pair of crank arms 30f that are integrally formed with the crank journals 30c. The crankshaft 30 is rotatably supported in the left crankcase member 4 and the right crankcase member 3 by bearings 56 and 55, respectively.

A crankpin 30g is press-fitted in the crank arms 30f, so that the crankpin 30g and the crank journals 30c are coupled with each other with the degree of rigidity required for the crankshaft 30.

The cylinder body 5 has the single cylinder 10 with a cylinder bore 11 defined therein which extends vertically therethrough as shown in FIG. 14. A piston 12 is slidably fitted in the cylinder bore 11 and operatively connected to the crankpin 30g of the crankshaft 30 by a connecting rod 13.

Figure 4:
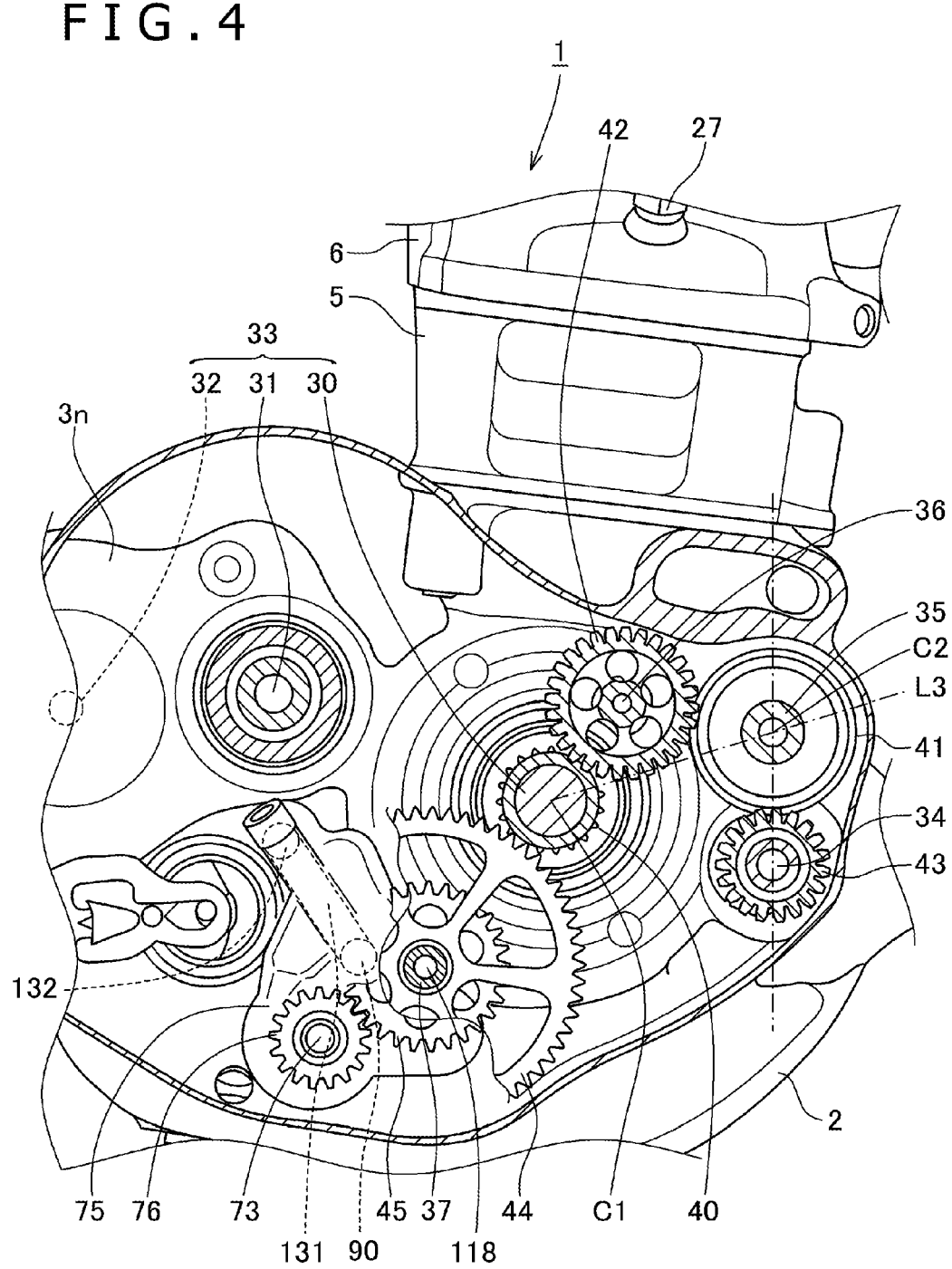
FIG. 4 is a right-hand side elevational view of the power unit, partly in vertical cross section.

FIG. 4 shows the power unit 1 in right-hand side elevation, partly in vertical cross section. The crankshaft 30, a main shaft 31, and a countershaft 32 serve as transmission gear shafts 33 disposed parallel to each other in the crankcase 2 and rotatably supported therein by bearings 56 (see FIG. 2).

Figure 15:
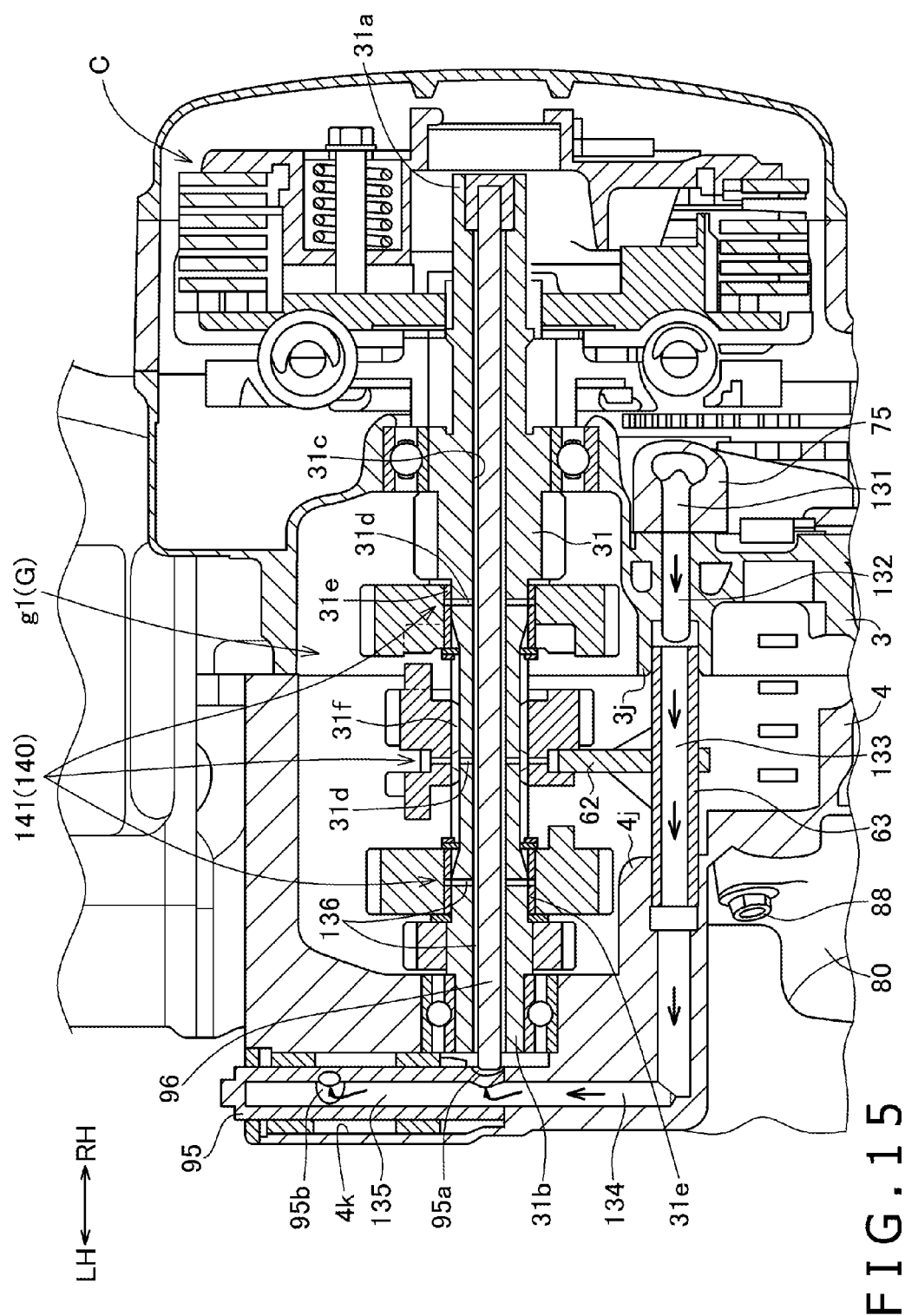
FIG. 15 is a sectional left-hand side elevational view of the power unit, taken along a plane extending through the axis of a main shaft and the axis of a shift fork shaft.

As shown in FIG. 15, the main shaft 31 has a right end portion 31a on which there is provided a clutch device C. Rotational drive power from the crankshaft 30 is transmitted through the clutch device C to the main shaft 31, and then from the main shaft 31 through the transmission M to the countershaft 32.

Figure 9:
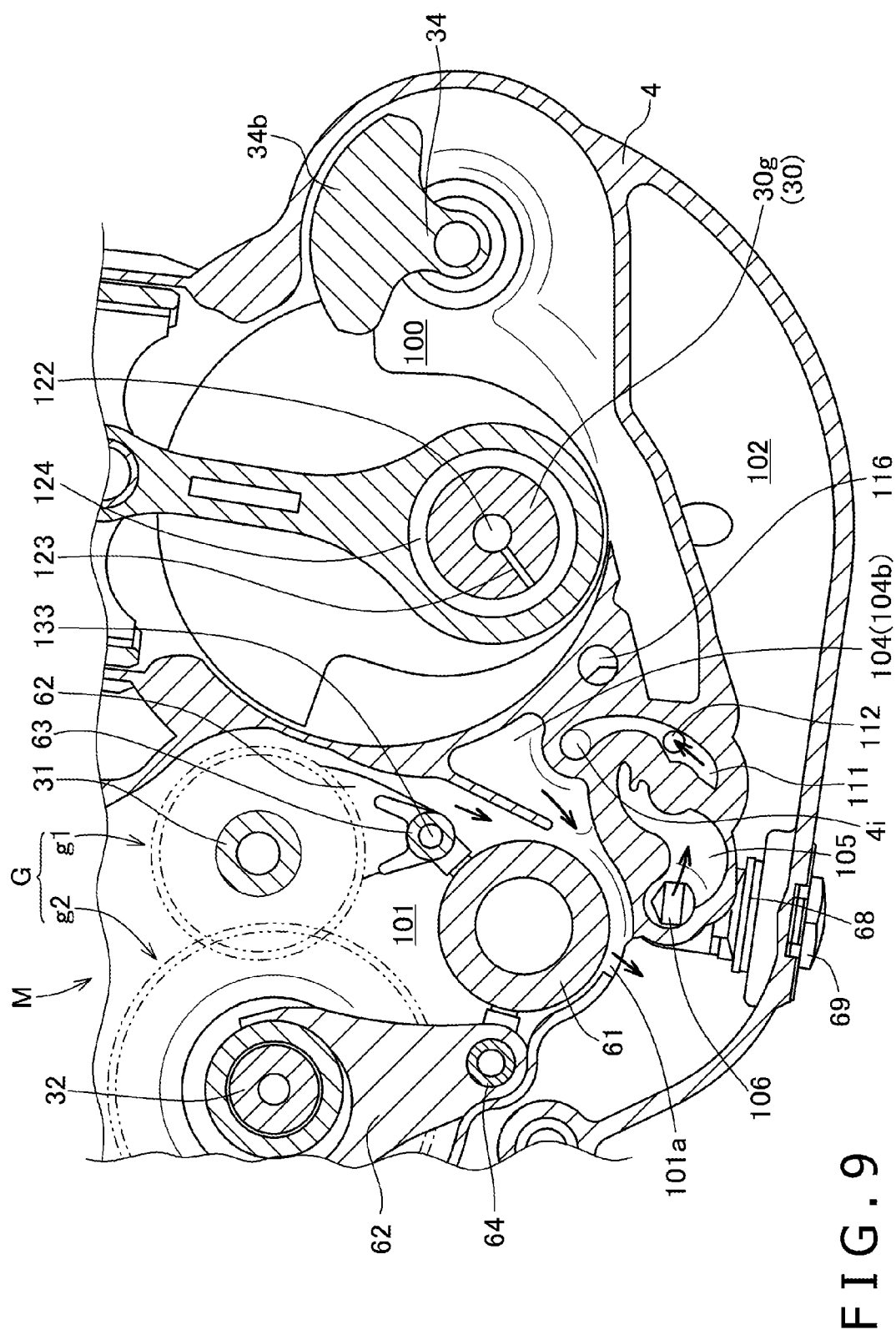
FIG. 9 is a cross-sectional view taken along line IX-IX of FIG. 5.

As shown in FIG. 9, the transmission M is provided with a transmission gear train G including a main gear train g1 mounted on the main shaft 31 and a counter gear train g2 mounted on the countershaft 32, and a transmission selector device including a shift drum 61 and shift forks 62 that are actuated by a transmission actuating mechanism.

As shown in FIG. 15, the main shaft 31 has a left end portion 31*b* on which there is provided a clutch lifter lever shaft 95. A push rod 96 is inserted axially in the main shaft 31. When the rider of the motorcycle operates a clutch lever, not shown, the clutch lifter lever shaft 95 is actuated to move the push rod 96 axially in one direction or the other, thereby engaging or disengaging the clutch device C.

As shown in FIG. 4, a balancer shaft 34 is disposed in the crankcase 2 and positioned forwardly of and parallel to the crankshaft 30. The balancer shaft 34 is rotatably supported in the right crankcase member 3 and the left crankcase member 4 by bearings, not shown. A balancer weight 34*b* (see FIGS. 8 and 9) is mounted on the balancer shaft 34 at a substantially central position of the length of the balancer shaft 34. The balancer shaft 34 is so disposed that the balancer weight 34*b* has its widthwise center aligned with the parting plane of the crankcase 2. The balancer shaft 34 has a right end portion projecting outwardly from a right side wall of the right crankcase member 3, with a balancer gear 43 (FIG. 4) mounted on the right end portion for co-rotation therewith.

As shown in FIG. 14, the crankshaft 30 has a right end portion 30*a* projecting outwardly from the right crankcase member 3. A drive gear 40 which serves as a power transmitting member of the crankshaft 30 is mounted on the right end portion 30*a* for co-rotation therewith. The crankshaft 30 has a left end portion 30*b* on which the electric power generator 65 is mounted.

Figure 11:
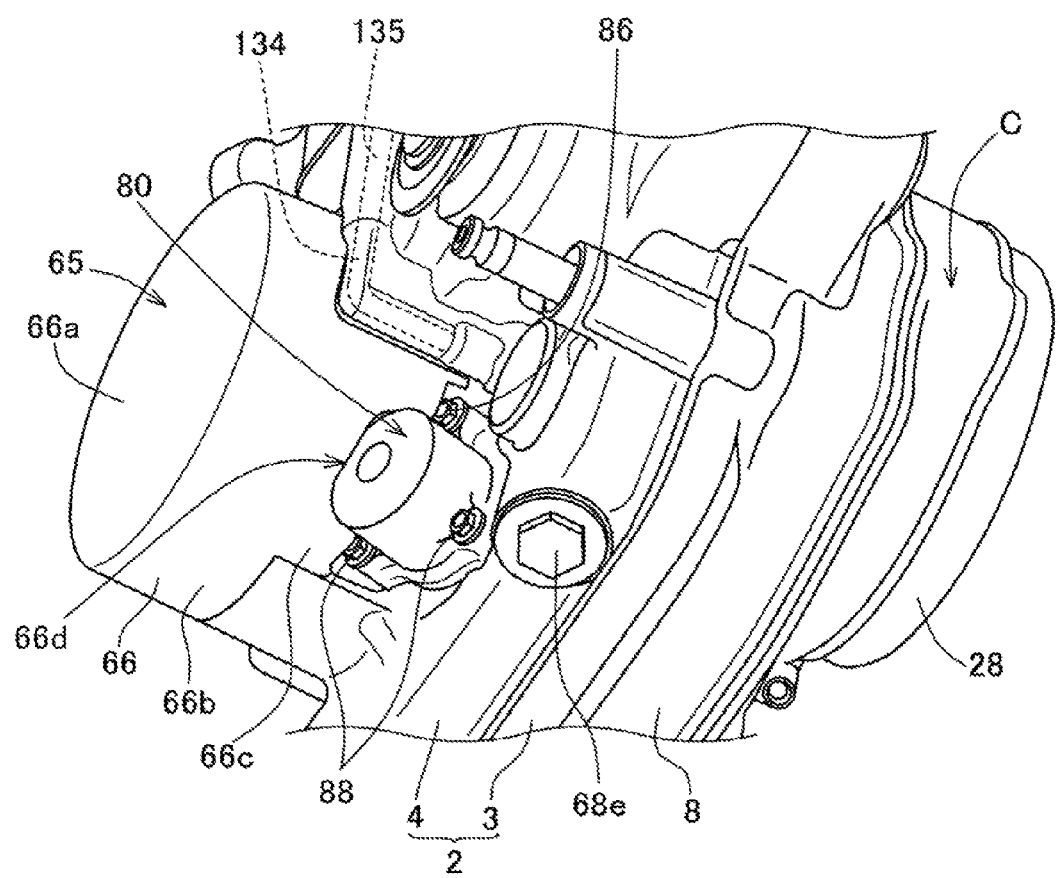
FIG. 11 is a fragmentary perspective view of the power unit as viewed obliquely from below on the left.

The electric power generator 65 includes an inner stator 65*s* in the form of a coil fixed to a left side surface of the left crankcase member 4, an outer rotor 65*r* holding magnets on its peripheral wall and fixed to the left end portion 30*b* of the crankshaft 30 for co-rotation therewith, and the generator cover 66 attached to the left crankcase member 4 in covering relation to the outer rotor 65*r*. As shown in FIGS. 11 and 14, the generator cover 66 is of a bottomed hollow cylindrical shape having a top wall 66*a* and a peripheral wall 66*b*. The peripheral wall 66*b* includes a portion formed as an axially extended wall 66*c* having an increased length from the top wall 66*a*. The extended wall 66*c* has a recess 66*d* defined therein which clears a lubricant oil filter 80 to be described later.

As shown in FIG. 4, a pair of power transmitting gears 41 and 42 for transmitting rotation of the crankshaft 30 to the balancer shaft 34 is disposed between the crankshaft 30 and the balancer shaft 34. The power transmitting gears 41 and 42 are also referred to as a first power transmitting gear 41 and a second power transmitting gear 42, respectively, which are mounted for co-rotation on a first power transmitting gear shaft 35 and a second power transmitting gear shaft 36, respectively, rotatably supported by the right crankcase cover 8.

The second power transmitting gear 42 and the balancer gear 43 are held in mesh with the first power transmitting gear 41, while the drive gear 40 and the first power transmitting gear 41 are held in mesh with the second power transmitting gear 42. Rotational drive power from the crankshaft 30 is transmitted successively to the drive gear 40, the second power transmitting gear 42, the first power transmitting gear 41, and the balancer gear 43, rotating the balancer shaft 34 about its own axis. The numbers of teeth of the drive gear 40, the balancer gear 43, the first power transmitting gear 41, and the second power transmitting gear 42 are selected such that the crankshaft 30 and the balancer shaft 34 rotate in synchronism with each other, making the balancer weight 34*b* effective to reduce primary vibrations of the piston 12. As shown in FIG. 2, a water pump 50 is operatively connected to the first power transmitting gear 41.

As shown in FIG. 4, a first speed reduction gear 44 and a second speed reduction gear 45 are disposed rearwardly and downwardly of the crankshaft 30. These first and second speed reduction gears 44 and 45 are mounted for co-rotation on a speed reduction gear shaft 37 rotatably supported by both the right crankcase member 3 and the right crankcase cover 8. An oil pump shaft 73 rotatable in unison with an oil pump assembly 70 (see FIG. 5) is disposed rearwardly and downwardly of the speed reduction gear shaft 37. The speed reduction gear shaft 37 is in the form of a hollow tube whose inner space serves as a speed reduction gear shaft oil passage 118 for oil to flow therein, as will be described later.

The first speed reduction gear 44, which is larger in diameter than the second speed reduction gear 45, is held in mesh with the drive gear 40 on the crankshaft 30, while the second speed reduction gear 45 is held in mesh with an oil pump gear 76 on the oil pump shaft 73. Rotational drive power from the crankshaft 30 is transmitted through the drive gear 40 and the first and second speed reduction gears 44 and 45 to the oil pump gear 76, so that the oil pump assembly 70 is actuated by the crankshaft 30.

Figure 5:
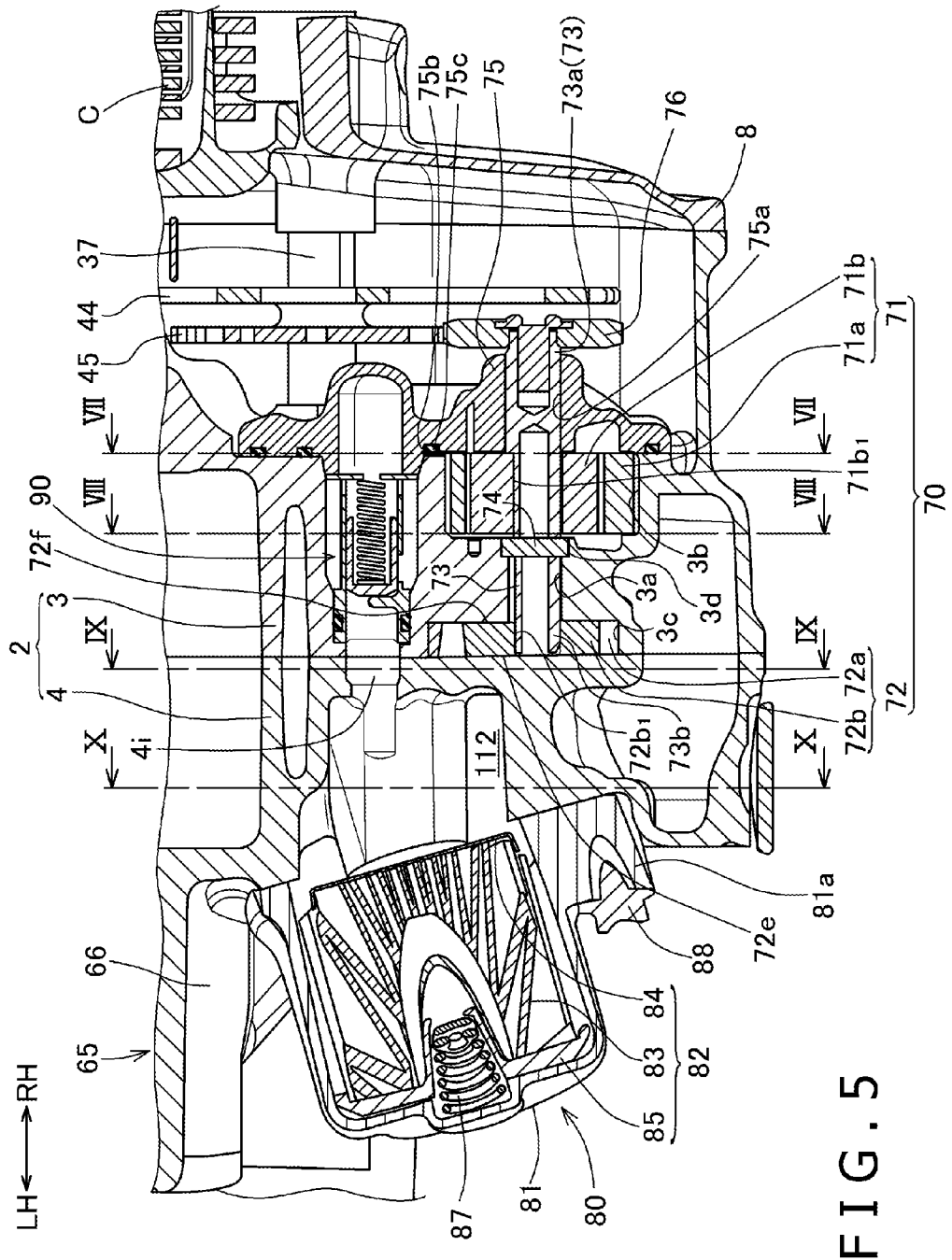
FIG. 5 is a fragmentary vertical cross-sectional view of the power unit, taken along a plane extending through the center of an oil pump shaft.

As shown in FIG. 5, the oil pump assembly 70 includes a scavenger pump 71 for delivering oil from a crankshaft chamber 100 (see FIG. 8) to an oil reservoir 102 (see FIG. 8) and a feed pump 72 for delivering oil from the oil reservoir 102 under pressure to various parts of the internal combustion engine E. The scavenger pump 71 and the feed pump 72 are actuated by the single oil pump shaft 73, which lies parallel to the crankshaft 30. The scavenger pump 71 is disposed on a right portion 73*a* of the oil pump shaft 73, and the feed pump 72 is disposed on a left portion 73*b* of the oil pump shaft 73.

The scavenger pump 71 and the feed pump 72 are trochoidal pumps and have respective outer rotors 71*a* and 72*a* and respective inner rotors 71*b* and 72*b* that are inserted in the respective outer rotors 71*a* and 72*a*.

About one-third of the oil pump shaft 73 on its right portion 75*a* has a cross-sectional shape having a circular outer profile, and the rest of the oil pump shaft 73 on its left portion 75*b* has a cross-sectional shape having a D-shaped profile with a circumferential portion of a circular outer profile cut by a planar plane. The inner rotors 71*b* and 72*b* have oil pump shaft fitting holes $71b_1$ and $72b_1$, respectively, formed therein which have a D-shaped cross-sectional shape complementary to the D-shaped cross-sectional outer profile of the left portion 73*b* of the oil pump shaft 73. When the oil pump shaft 73 is fitted in the oil pump shaft fitting holes $71b_1$ and $72b_1$, the inner rotors 71*b* and 72*b* are fitted over the oil pump shaft 73 for co-rotation therewith. A positioning pin 74 is inserted diametrically through the left portion 73*b* of the oil pump shaft 73 which has the D-shaped cross-sectional outer profile at an axial position between the scavenger pump 71 and the feed pump 72.

The right crankcase member 3 has an oil pump shaft insertion hole 3*a* defined therein through which the oil pump shaft 73 extends. The right crankcase member 3 also has a scavenger pump housing compartment 3*b* defined in a right side surface thereof around the oil pump shaft insertion hole 3*a* and housing the scavenger pump 71 therein, and a feed pump housing compartment 3*c* defined in a left side surface thereof around the oil pump shaft insertion hole 3*a* and housing the feed pump 72 therein. The right crankcase member 3 further includes a step 3*d* formed adjacent to the left side of the scavenger pump housing compartment 3*b* between the scavenger pump housing compartment 3*b* and the oil pump shaft insertion hole 3a. The step 3d and the left side of the scavenger pump housing compartment 3b define a positioning pin housing recess in which the positioning pin is placed. The scavenger pump housing compartment 3b and the positioning pin housing compartment are held in fluid communication with each other.

The scavenger pump 71 and the feed pump 72 are assembled in the power unit 1 in the following manner. The positioning pin is inserted through the oil pump shaft 73 and the inner rotor 71b of the scavenger pump 71 is installed on the oil pump shaft 73. Thereafter, the oil pump shaft 73, the positioning pin 74, and the inner rotor 71b are inserted together into the right crankcase member 3 from the scavenger pump housing compartment 3b. The oil pump shaft 73 has its left end portion inserted into the oil pump shaft insertion hole 3a, and the positioning pin 74 is inserted into the positioning pin housing compartment until it abuts against the step 3d, whereupon the oil pump shaft 73 stops moving to the left.

Figure 7:
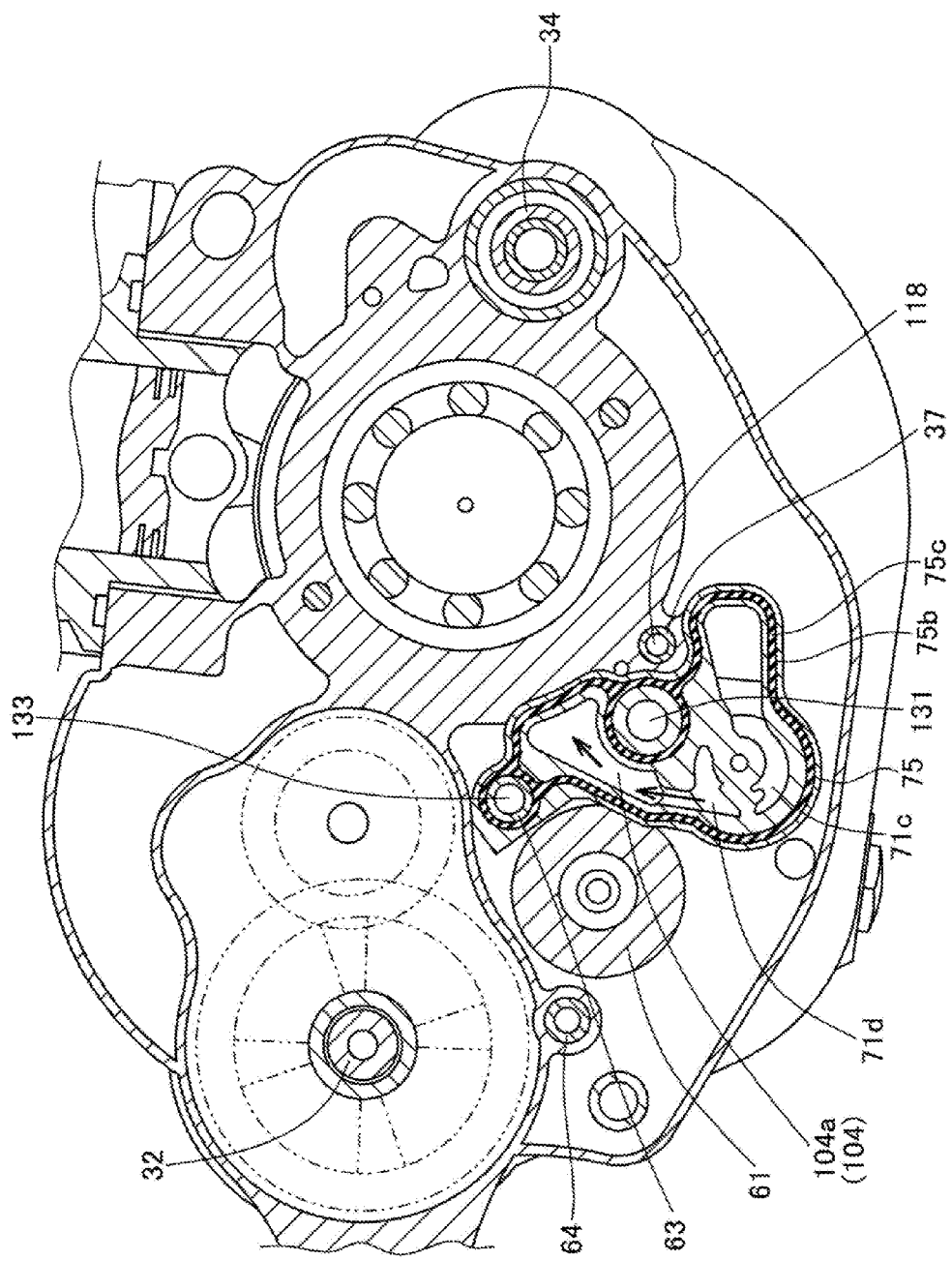
FIG. 7 is a cross-sectional view taken along line VII-VII of FIG. 5.

Thereafter, the outer rotor 71a of the scavenger pump 71 is inserted into the scavenger pump housing compartment 3b, and an oil pump cover 75 for preventing the scavenger pump 71 from being dislodged is secured to the right end surface of the right crankcase member 3. As shown in FIGS. 5 and 7, the oil pump cover 75 has a seal groove 75b formed in its peripheral edge thereof and a seal member is fitted in the seal groove 75b, so that the oil pump cover 75 is attached to the right crankcase member 3 in a fluid-tight fashion.

The oil pump cover 75 has an oil pump shaft insertion hole 75a defined therein, and the oil pump shaft 73 has its right end portion 73a inserted in the oil pump shaft insertion hole 75a so as to project from the oil pump cover 75 to be mounted thereon with the oil pump gear 76. The oil pump gear 76 mounted on the right end portion 73a of the oil pump shaft 73 is positioned on the opposite side of the feed pump 72 with respect to the scavenger pump 71 and serves as a drive member for rotating the oil pump shaft 73 about its own axis.

The oil pump shaft 73 is thus positioned in place by the positioning pin inserted through the oil pump shaft 73 at a position between the scavenger pump 71 and the feed pump 72, by the step 3d formed in the right crankcase member 3 to place the positioning pin, and by the oil pump cover 75 mounted on the right crankcase member 3 and holding the scavenger pump 71 against dislodgement.

As described above, the right crankcase member 3 has the feed pump housing compartment 3c defined in the left side surface thereof. The inner rotor 72b of the feed pump 72 is inserted in the feed pump housing compartment 3c and installed on the left end portion 73b of the oil pump shaft 73, and the outer rotor 72a of the feed pump 72 is inserted in the feed pump housing compartment 3c. When the right crankcase member 3 and the left crankcase member 4 are combined together, the feed pump 72 has the left side surface thereof positioned in the same plane as the left and right mating surfaces of the crankcase members 3 and 4. The scavenger pump 71 is disposed on the right side of the feed pump 72.

The oil pump shaft 73 is rotated about its own axis by the crankshaft 30 through the drive gear 40 mounted on the right end portion 30a of the crankshaft 30, the first and second speed reduction gears 44 and 45, and the oil pump gear 76 mounted on the right end portion 73a of the oil pump shaft 73, whereby the scavenger pump 71 and the feed pump 72 are operated.

Flows of oil delivered to various parts of the power unit 1 by the oil pump assembly 70 will be described below.

Figure 17:
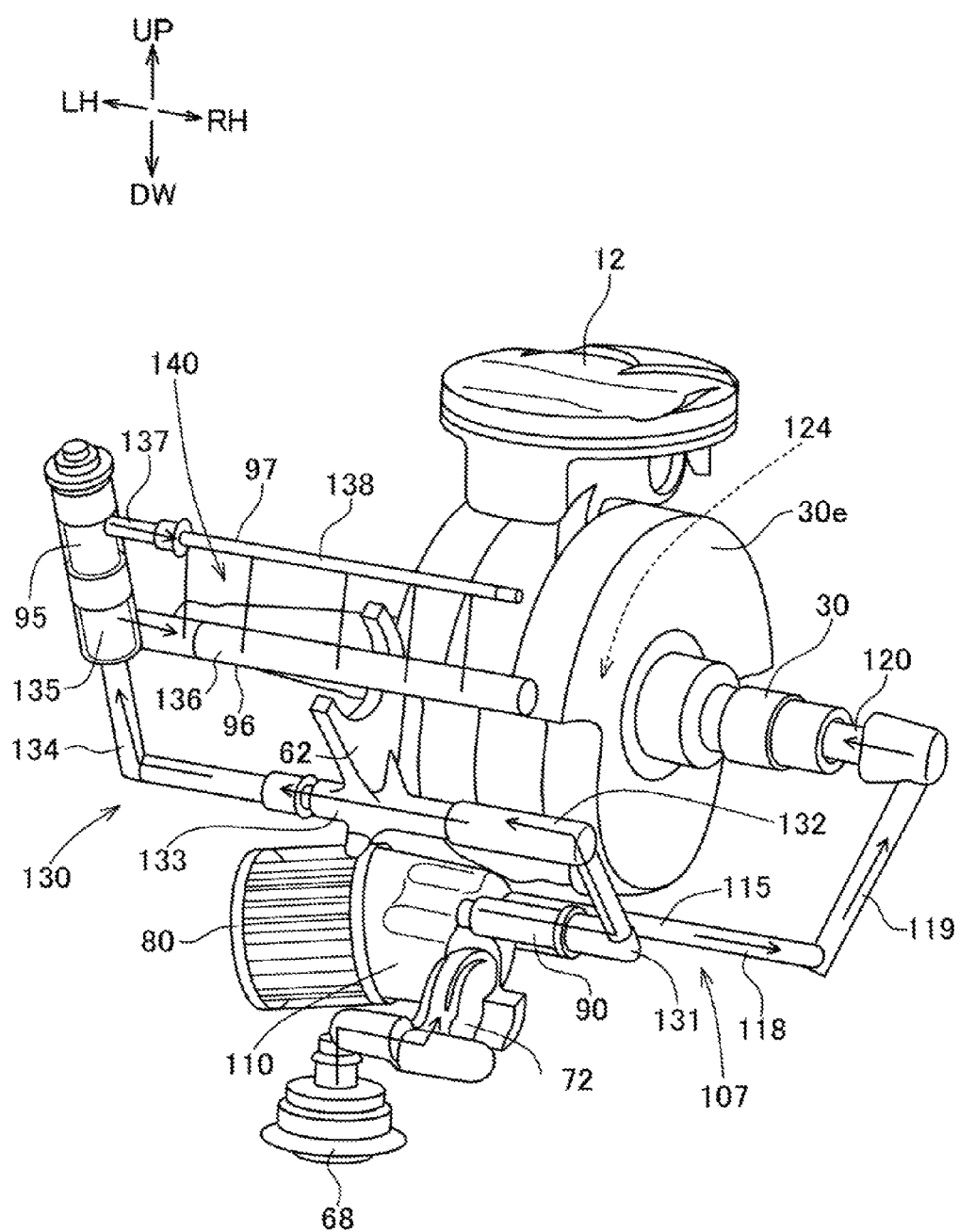
FIG. 17 is a perspective view of an oil passage system of the power unit.

FIGS. 7 through 10 are vertical cross-sectional views taken along the section lines of FIG. 5, applied with signs corresponding to the respective figure numbers. FIG. 17 shows in perspective an oil passage system for delivering oil under pressure to the various parts of the power unit 1 from the oil pump assembly 70.

As shown in FIG. 9, the inner space of the power unit 1 is divided into the crankshaft chamber 100 in which the crankshaft 30 and the balancer shaft 34 are disposed, a transmission chamber 101 in which the transmission M provided with the main shaft 31, the countershaft 32, and the transmission gear train G are disposed, and the oil reservoir 102 in which oil is stored.

Figure 8:
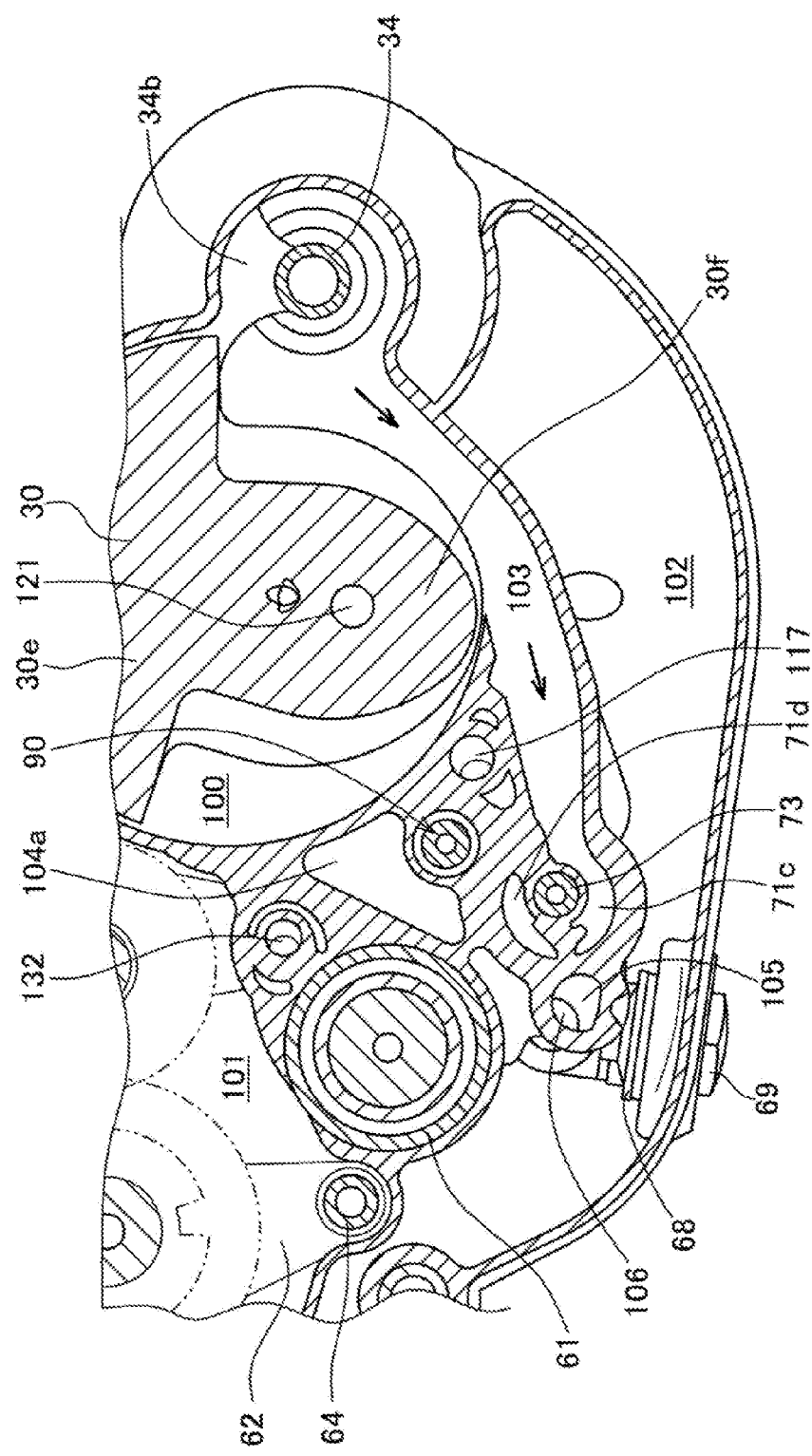
FIG. 8 is a cross-sectional view taken along line VIII-VIII of FIG. 5.

As shown in FIG. 8, the crankshaft chamber 100 has in its lower area a scavenger pump inlet oil passage 103 that is held in fluid communication with an inlet port 71c of the scavenger pump 71 and extends obliquely rearwardly and downwardly from a lower portion of the crankshaft chamber 100. Oil supplied to the crankshaft and scattered into the crankshaft chamber 100 flows down along a wall surface of the crankshaft chamber 100 and through the scavenger pump inlet oil passage 103, and is introduced into the scavenger pump 71 through the inlet port 71c thereof.

As shown in FIG. 7, the scavenger pump 71 has an outlet port 71d held in fluid communication with a scavenger pump outlet oil passage 104 which includes a pump case outlet oil passage 104a defined in the oil pump cover 75 and a crankcase outlet oil passage 104b (see FIG. 9) defined in the left crankcase member 3. Oil discharged from the scavenger pump 71 enters the pump case outlet oil passage 104a defined in the oil pump cover 75 and then flows into the crankcase outlet oil passage 104b defined in the left crankcase member 3.

As shown in FIG. 9, the transmission chamber 101 in the crankcase 2 has a lower portion held in fluid communication with the crankcase outlet oil passage 104b of the scavenger pump outlet oil passage 104. The transmission chamber 101 has in its lowest region an opening 101a that is held in fluid communication with the oil reservoir 102.

Oil discharged from the scavenger pump 71 flows out of the scavenger pump outlet oil passage 104 into the transmission chamber 101. Oil supplied to the transmission M in the transmission chamber 101 is scattered in the transmission chamber 101 and flows down the wall of the transmission chamber 101 into the lower portion thereof where the oil is mixed with the oil from the scavenger pump 71. The combined oil then flows through the opening 101a of the transmission chamber 101 into the oil reservoir 102 where it is stored.

Figure 10:
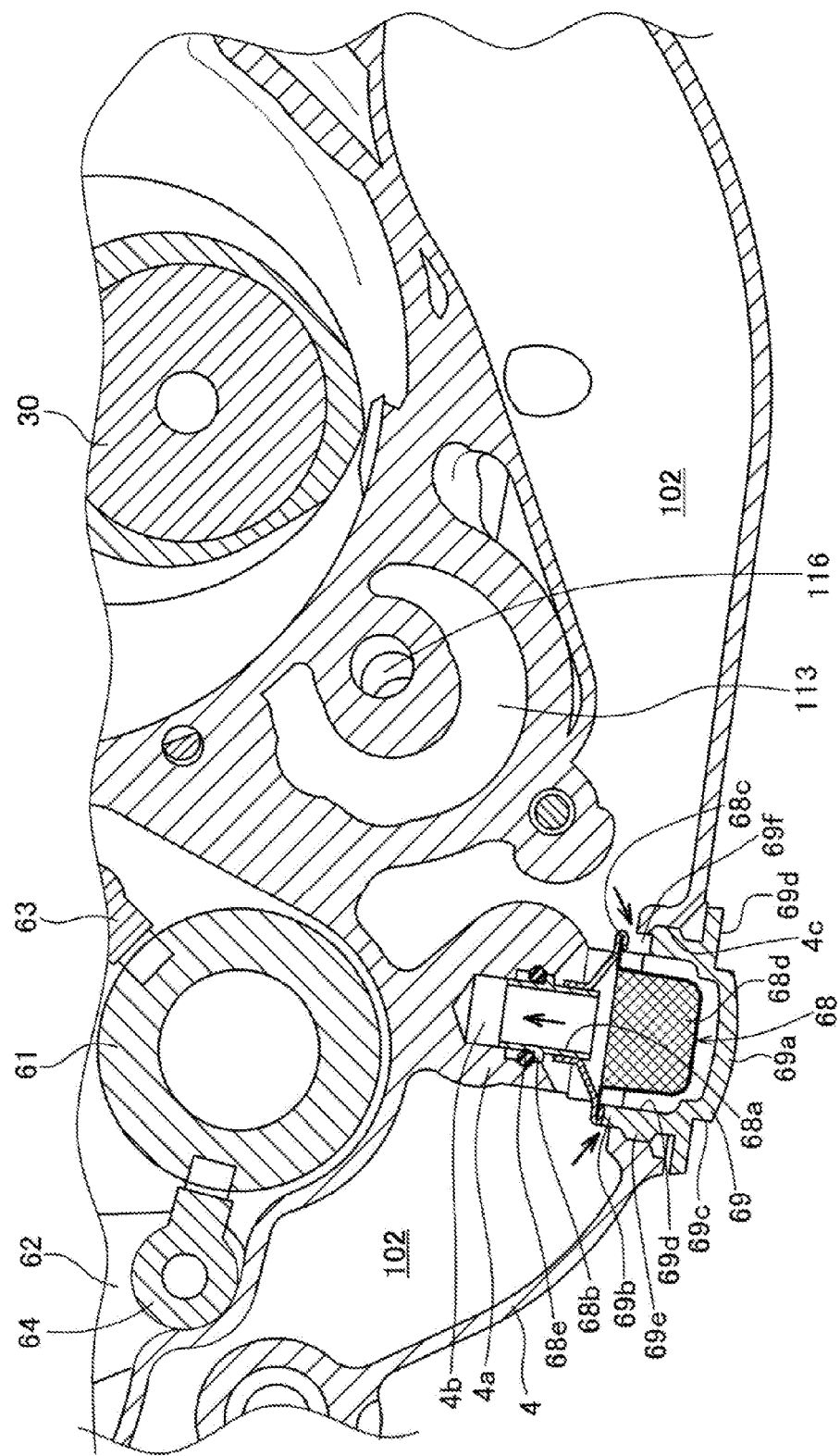
FIG. 10 is a cross-sectional view taken along line X-X of FIG. 5.

As shown in FIG. 10, an oil strainer 68 for filtering oil is disposed in the crankcase 2 in fluid communication with the oil reservoir 102. The oil strainer 68 includes a tubular member 68a, a flange 68c extending radially outwardly from the tubular member 68a, and a cup-shaped screen 68d mounted on the flange 68c. The tubular member 68a has a ridge 68b extending around the outer circumferential surface thereof at an upper position which is spaced from the upper end thereof by about one-quarter of the length of the oil strainer 68. The flange 68c on which the cup-shaped screen 68d is mounted is brazed to or crimped on the oil strainer 68 at a vertically intermediate position.

The left crankcase member 4 includes an oil strainer mount 4a hanging downwardly into the oil reservoir 102 and having an oil strainer mount hole 4b defined therein in which the tubular member 68a of the oil strainer 68 is inserted. The left crankcase member 4 also has an oil strainer insertion hole 4c defined therein which is positioned in a lower portion of the oil reservoir 102. When the oil strainer 68 is to be placed in the left crankcase member 4, the oil strainer 68 is inserted through the oil strainer insertion hole 4c into the left crankcase member 4.

The oil strainer 68 with an oil seal 68e mounted on the ridge 68b is inserted through the oil strainer insertion hole 4c into the left crankcase member 4, and the tubular member 68a is fitted in the oil strainer mount hole 4b of the oil strainer mount 4a. Thereafter, an oil strainer holder 69 is threaded into the oil strainer insertion hole 4c, holding the oil strainer 68 in the power unit 1.

The oil strainer holder 69, which is in the form of a bottomed tube, includes a bottom 69a, a tubular member 69b, a hexagonal boss 69c disposed on a bottom surface of the bottom 69a, a flange 69d disposed between the bottom 69a and the tubular member 69b, an externally threaded outer circumferential surface 69e of the tubular member 69b which is threaded in the oil strainer insertion hole 4c, and a recess 69f defined in the upper end of the tubular member 69b.

After the oil strainer 68 has been inserted through the oil strainer insertion hole 4c into the left crankcase member 4, and the oil strainer holder 69 is threaded into the oil strainer insertion hole 4c, the upper end of the tubular member 69b of the oil strainer holder 69 is held in abutment against the flange 68c of the oil strainer 68, holding the oil strainer 68 securely in position. Oil stored in the oil reservoir 102 flows through the recess 69f in the tubular member 69b into the oil strainer holder 69.

Figure 13:
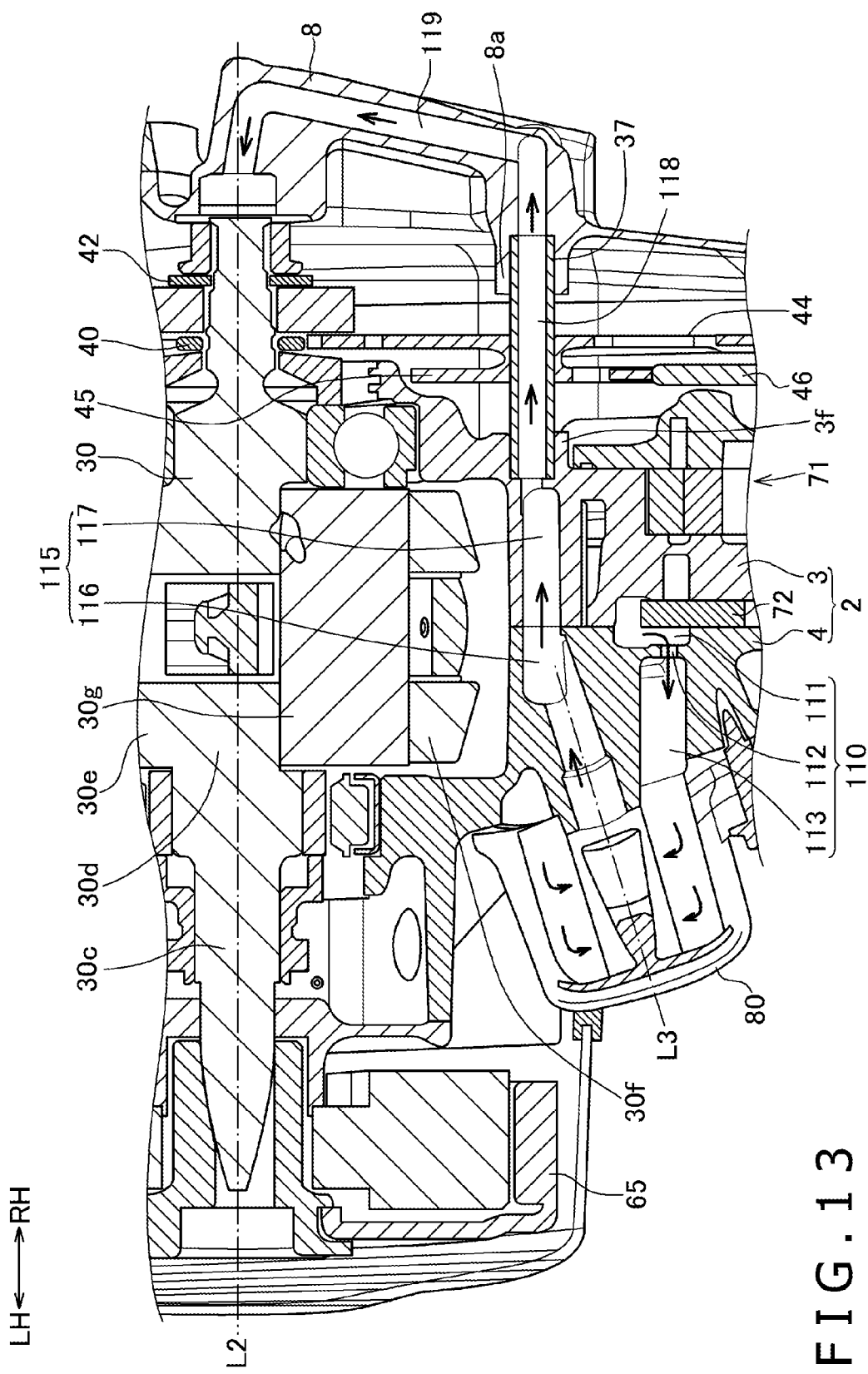
FIG. 13 is a fragmentary cross-sectional view of the power unit, showing a feed oil passage.

As shown in FIG. 9, the left crankcase member 4 has a feed pump communication hole 106 defined therein which provides fluid communication between the oil strainer mount hole 4b and a feed pump inlet oil passage 105 for supplying oil to the feed pump 72. As shown in FIG. 13, a feed pump outlet oil passage 111 through which oil discharged from the feed pump 72 flows is defined jointly by the right crankcase member 3 and the left crankcase member 4.

When the feed pump 72 is actuated, oil stored in the oil reservoir 102 flows through and is filtered by the oil strainer 68, and is delivered from the feed pump communication hole 106 through the feed pump inlet oil passage 105 to the feed pump 72, which discharges the oil from the feed pump outlet oil passage 111.

As shown in FIG. 1, the oil filter 80 is disposed on the left side surface of the left crankcase member 4 so as to partly overlap the electric power generator 65 and to be partly offset from the electric power generator 65 as viewed in the direction of the crankshaft axis L2. As will be noted from FIG. 5, the oil filter 80 is disposed on the opposite side of the feed pump 72 with respect to the parting plane of the crankcase members 3 and 4.

Figure 12:
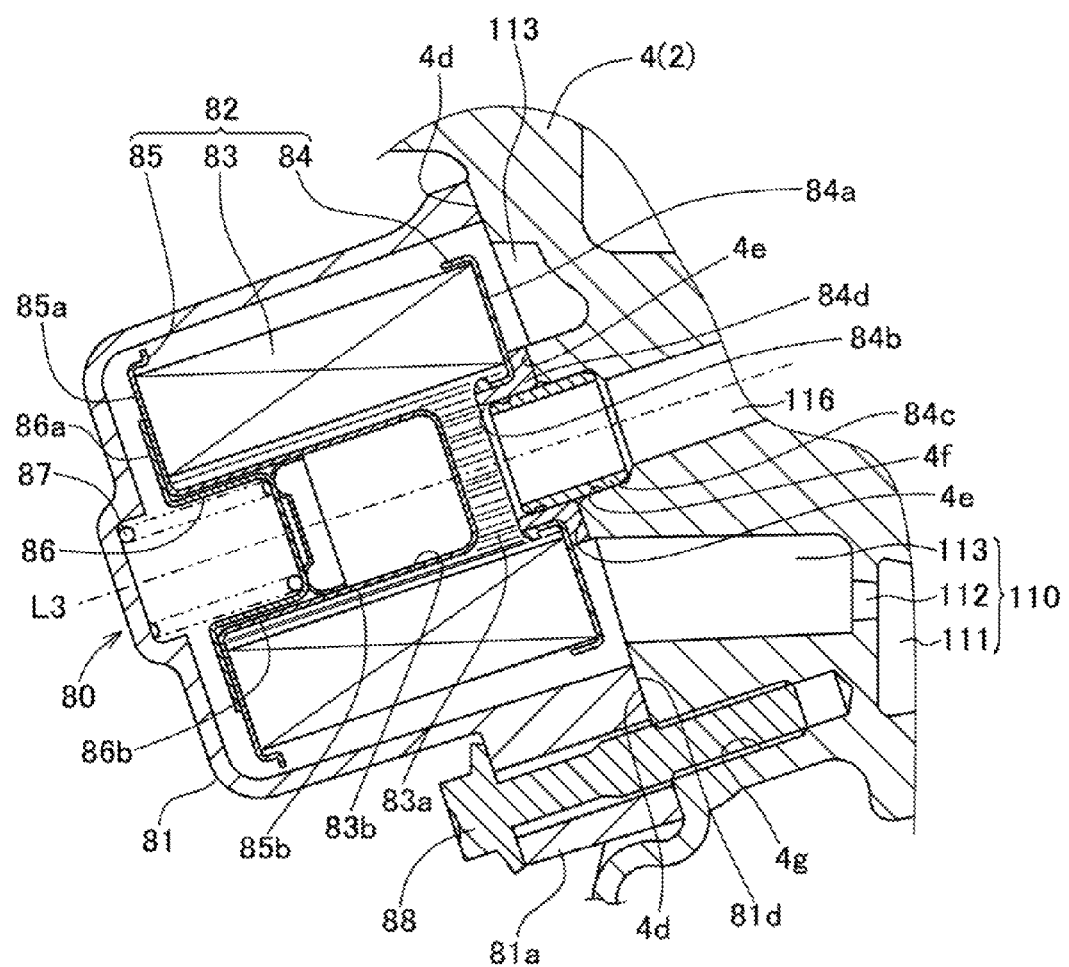
FIG. 12 is a fragmentary vertical cross-sectional view of the power unit, taken along a plane extending through the center of an oil filter.

As shown in FIG. 12, the oil filter 80 includes a replaceable filter element 82 and an oil filter casing 81 covering the replaceable filter element 82. The left crankcase member 4 has a filter casing mounting seat 4d on which the oil filter casing 81 is mounted, and an oil passage seat 4e positioned centrally in the filter casing mounting seat 4d.

An oil filter inlet passage 113 for introducing lubricant oil into the oil filter 80 is formed in the left crankcase member 4 between the filter casing mounting seat 4d and the oil passage seat 4e. A left feed oil passage 116 for delivering oil from the lubricant oil filter 80 is defined in the left crankcase member 4 centrally in the oil passage seat 4e. As shown in FIG. 13, the oil filter inlet passage 113 is held in fluid communication with the feed pump outlet oil passage 111 through a fluid communication hole 112. The feed pump outlet oil passage 111, the fluid communication hole 112, and the oil filter inlet passage 113 jointly make up an oil filter supply oil passage 110 for delivering oil from the feed pump 72 to the oil filter 80. The oil filter supply oil passage 110 is defined in the crankcase 2 at a position between the oil filter 80 and the feed pump 72, and hence serves as a compact oil passage.

As shown in FIG. 12, the replaceable filter element 82 includes a tubular layered filter paper body 83 made of a filter paper layered into a tubular form, and a pair of plate-like members 84 and 85 covering the respective opposite ends of the tubular layered filter paper body 83. Of the plate-like members 84 and 85, the plate-like member 84 which is positioned closer to the left crankcase member 4 has a circular oil outlet 84b defined in a circular plate 84a for discharging filtered oil. An outlet tube 84c for delivering oil from the oil filter 80 therethrough and a holder 84d that holds the outlet tube 84c are fitted in the oil outlet 84b and integrally secured therein.

The other plate-like member 85 includes a bottomed tubular portion 85b formed centrally on a plate 85a. The bottomed tubular portion 85b is inserted in a filter hole 83a defined centrally in the tubular layered filter paper body 83. A spring holder 86 which holds a spring 87 to be described later is mounted in the plate-like member 85. The spring holder 86 includes a plate 86a held against and fixed to the plate 85a of the plate-like member 85 and a tubular portion 86b fitted in the bottomed tubular member 85b of the plate-like member 85.

The oil filter 80 is assembled on the crankcase 2, i.e., the left crankcase member 4, in the following manner. The replaceable filter element 82 has its outlet tube 84c inserted in an outlet tube insertion hole 4f formed in the left crankcase member 4 and its holder 84d held against the oil passage seat 4e.

Then, a spring 87 for pressing the replaceable filter element 82 against the left crankcase member 4 to hold the replaceable filter element 82 in position on the left crankcase member 4, is placed between the oil filter casing 81 and the spring holder 86 of the replaceable filter element 82. The oil filter casing 81 has an end face 81d abutting against the filter casing mounting seat 4d of the left crankcase member 4. Bolts 88 are inserted through respective bosses 81a on the outer circumference of the oil filter casing 81 and threaded into bolt holes 4g defined in the left crankcase member 4, thereby fastening the oil filter 80 to the crankcase 2.

As shown in FIG. 3, the oil filter 80 is oriented so that an axis L3 along which the oil filter 80 is installed on the crankcase 2, i.e., a filter mount axis L3, forms an acute angle to the crankshaft axis L2. Furthermore, the oil filter casing 81 of the oil filter 80 is disposed obliquely with respect to the crankshaft axis L2 so as to be positioned inside of a line L4 that interconnects an outer edge 66e of the generator cover 66 and an outer side edge 102a of the oil reservoir 102 in the lower portion of the crankcase 2. Since the generator cover 66 does not project beyond the line L4, the banking angle of the motorcycle, not shown, on which the power unit 1 is mounted can be increased. As shown in FIG. 13, the oil filter 80 is disposed between the electric power generator 65 and the crank weights 30e as viewed from the front, i.e., as viewed in a direction perpendicular to the cylinder axis L1 and the crankshaft axis L2. In other words, the oil filter 80 is disposed between the electric power generator 65 and the crank weights 30e with respect to a direction along the axis (L2) of the crankshaft (30). Therefore, the oil filter 80 is arranged in a compact layout.

As shown in FIG. 1, the oil filter casing 81 is disposed so as to partly overlap the generator cover 66 that covers the electric power generator 65. As shown in FIG. 11, the generator cover 66 has the recess 66d that clears the oil filter 80 when the generator cover 66 is mounted on the crankcase 2. Moreover, as will be noted from FIG. 12, the bosses 81a by which the oil filter casing 81 is fastened to the left crankcase member 4 underlie and are covered with the generator cover 66 as viewed in the direction of the crankshaft axis L2, so that the bolts 88 used as fasteners inserted through the bosses 81a to fasten the oil filter casing 81 to the left crankcase member 4 are prevented from being dislodged.

As shown in FIG. 13, oil delivered from the feed pump 72 and flowing through the oil filter 80 is delivered from the outlet tube 84c (see FIG. 12) of the oil filter 80 to a feed oil passage 115. The feed oil passage 115 includes the left feed oil passage 116 held in fluid communication with the outlet tube 84c and extending obliquely upwardly and then horizontally in the left crankcase member 4, and a right feed passage 117 held in fluid communication with the left feed oil passage 116 and formed horizontally in the right crankcase member 3.

The feed oil passage 115 is disposed in a position adjacent to the feed pump 72 and overlapping the oil filter 80 as viewed in the direction of the crankshaft axis L2. The feed oil passage 115 is thus formed in a compact layout.

As indicated in FIG. 1, the oil filter 80 is disposed in the vicinity of the electric power generator 65 in overlapping relation to the generator cover 66, the clutch lifter lever shaft 95 is disposed in a space made available behind the electric power generator 65, and the oil strainer 68 is disposed below the clutch lifter lever shaft 95 and obliquely below and in the adjacency of the oil filter 80. Therefore, the height of the oil reservoir 102 communicating with the oil strainer 68 can be increased.

As shown in FIG. 13, the speed reduction gear shaft 37 has one end fitted in and supported by a support boss 3f on the right crankcase member 3 and the other end fitted in and supported by a support boss 8a on the right crankcase cover 8. The right oil passage 117 is open into the support boss 3f, and is held in fluid communication with the speed reduction gear shaft oil passage 118 in the speed reduction gear shaft 37.

The right crankcase cover 8 has a right crankcase cover oil passage 119 defined therein which is held in fluid communication with the support boss 8a and the speed reduction gear shaft oil passage 118. As FIG. 2 shows, the right crankcase cover oil passage 119 formed in the right crankcase cover 8 is oriented obliquely forwardly and upwardly toward the crankshaft axis L2 as viewed in the direction of the crankshaft axis L2. As shown in FIGS. 13 and 14, the right crankcase cover oil passage 119 has a downstream portion held in fluid communication with a crankshaft oil passage 121 defined in the crankshaft 30 through an orifice oil passage 120 in an orifice 57 in the right end portion 30a of the crankshaft 30.

The orifice 57 has its outer circumference sealed by an oil seal 58. Compared with the conventional structure wherein the outer circumference of the crankshaft is sealed, the oil seal 58 is smaller in size, providing a space for placing therein an outer clutch member C1 of the clutch device C.

The crankshaft oil passage 121 has a downstream end connected to a crankpin oil passage 122 defined in the crankpin 30g. Oil delivered into the crankpin oil passage 122 flows from the crankpin oil passage 122 through a discharge oil passage 123 in the crankpin 30g and is supplied to a feed-side lubricating region 124 between the crankshaft 30 and the connecting rod 13.

The power unit 1 is constructed as described above. As shown in FIGS. 13 and 17, oil discharged from the feed pump 72 is supplied to the lubricating region in the power unit 1. Specifically, the oil discharged from the feed pump 72 flows through the feed pump outlet oil passage 111, the fluid communication hole 112, and the oil filter inlet passage 113 of the oil filter supply oil passage 110 to the oil filter 80. The oil is then flows from the oil filter 80 through the left feed oil passage 116 and the right feed oil passage 117 of the feed oil passage 115, and through the speed reduction gear shaft oil passage 118 and the right crankcase cover oil passage 119 to the orifice oil passage 120. Then, as shown in FIG. 14, the oil flows from the orifice oil passage 120 through the crankshaft oil passage 121 and the crankpin oil passage 122 and is discharged through the discharge oil passage 123 and supplied to the feed-side lubricating region 124 between the crankpin 30g and the connecting rod 13, as also shown in FIG. 9.

When an oil pressure exceeding a predetermined value is build up in the oil filter supply oil passage 110 that extends from the feed pump 72 to the oil filter 80, relief oil is discharged from the oil filter supply oil passage 110 through a relief valve 90 (see FIG. 17). The flow of the relief oil and its oil passage will be described below.

As shown in FIG. 5, the relief valve 90, which discharges the oil from the oil filter supply oil passage 110 when an oil pressure exceeding a predetermined value is build up in the oil filter supply oil passage 110, is disposed adjacent to the feed pump 72 in overlapping relation to the oil filter 80 as viewed along the crankshaft axis L2.

Figure 6:
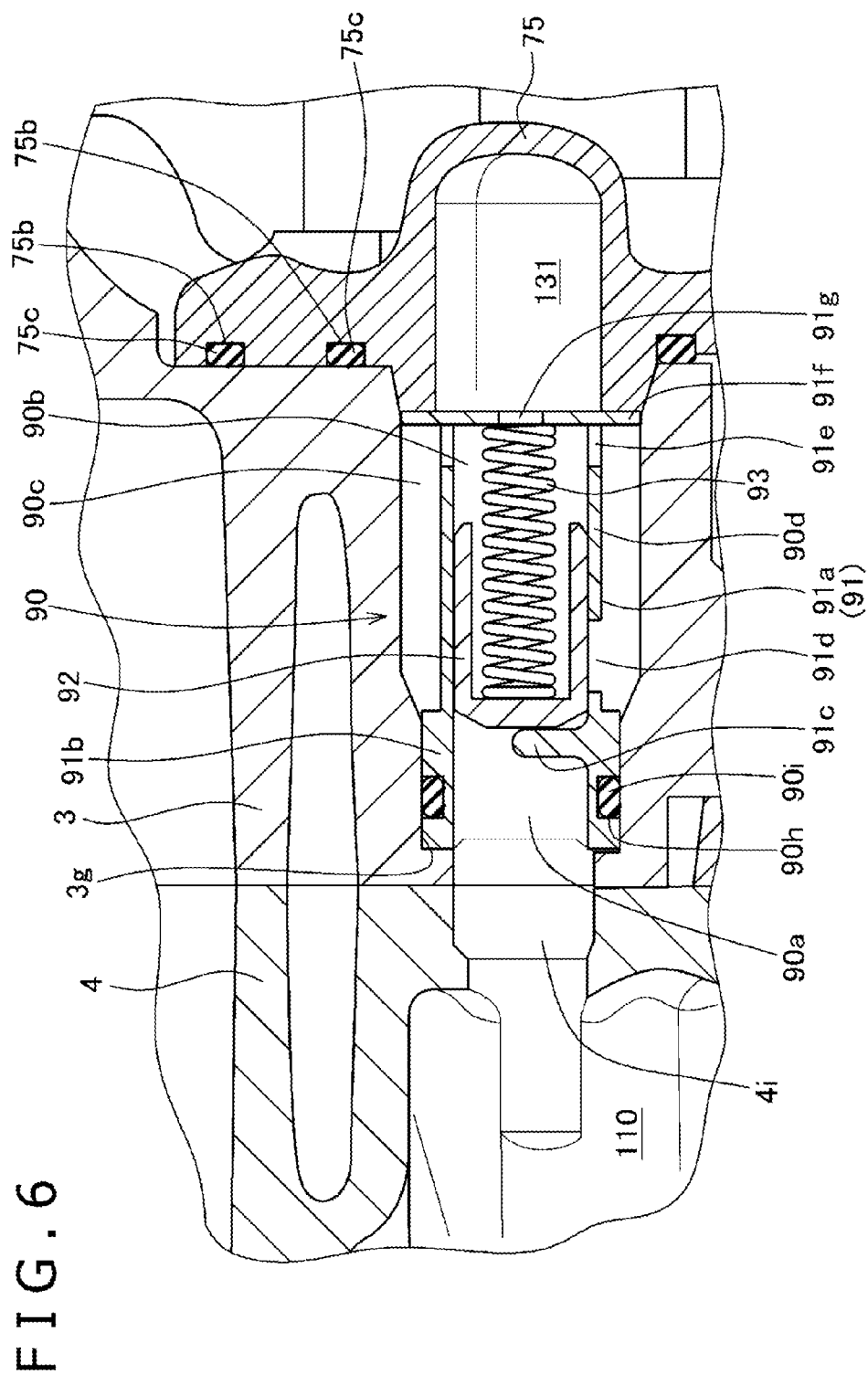
FIG. 6 is an enlarged fragmentary cross-sectional view of a relief valve and its periphery shown in FIG. 5.

As will be noted from FIG. 6, the right crankcase member 3 has a relief valve hole 3g defined therein, and the relief valve 90 is inserted into the relief valve hole 3g from the side of the oil pump cover 75 and secured in place against dislodgement by the oil pump cover 75. The relief valve hole 3g has a left end held in fluid communication with the oil filter inlet passage 113 through a relief valve communication hole 4i defined in the left crankcase member 4.

As also shown in FIG. 6, the relief valve 90 includes a tubular sleeve 91 having a bottom wall 91f, a bottomed tubular pressure bearing member 92 slidably fitted in the tubular sleeve 91, and a spring 93 disposed between the sleeve 91 and the bottomed tubular pressure bearing member 92. The inner space in the tubular sleeve is divided into a left sleeve space 90a and a right sleeve space 90b by the bottomed tubular pressure bearing member 92.

The tubular sleeve 91 includes a tubular member 91a having a ridge 91b extending around the outer circumference of the left end of the tubular member 91a. The ridge 91b has a groove 90h formed circumferentially therein and receiving an oil seal 90i fitted therein. The ridge 91b is fitted and fixed in the relief valve hole 3g. A space 90c is defined between the tubular member 91a and the wall of the right crankcase member 3 that defines the relief valve hole 3g, on the right side of the ridge 91b. The spring 93 is disposed between the bottomed tubular pressure bearing member 92 and the bottom wall 91f on a right end of the tubular sleeve 91, for normally biasing the bottomed tubular pressure bearing member 92 to move toward the left crankcase member 4.

The tubular member 91a has a stopper 91c projecting radially inwardly therefrom and positioned leftwardly of the bottomed tubular pressure bearing member 92 for preventing the bottomed tubular pressure bearing member 92 from moving to the left. The tubular member 91a also has a fluid communication hole 91d defined therein which is positioned rightwardly of the stopper 91c, providing fluid communication between the left sleeve space 90a and the space 90c around the tubular member 91a. The tubular member 91a further has a fluid communication hole 91e defined therein adjacent to the bottom wall 91f on the right end of the tubular member 91a, providing fluid communication between the right sleeve space 90b and the space 90c around the tubular member 91a. The bottom wall 91f on the right end of the tubular member 91a has a discharge port 91g defined therein which provides fluid communication between the right sleeve space 90b and an oil pump cover oil passage 131 defined in the oil pump cover 75.

The relief valve 90 which is constructed as described above operates in the following manner. When an oil pressure exceeding a predetermined value is build up in the oil filter supply oil passage 110 in the left crankcase member 4, the oil pressure in the left sleeve space 90a held in fluid communication with the oil filter supply oil passage 110 rises and moves the bottomed tubular pressure bearing member 92 to the right against the bias of the spring 93. When the tubular pressure bearing member 92 moves to the right, the fluid communication hole 91d defined in the tubular member 91a is opened, allowing oil to flow from the left sleeve space 90a into the space 90c around the tubular member 91a. The oil that has flowed into the space 90c flows through the fluid communication hole 91e into the right sleeve space 90b, and then flows through the discharge port 91g in the bottom wall 91f into the oil pump cover oil passage 131.

When the oil pressure in the oil filter supply oil passage 110 returns to a predetermined normal level, the bottomed tubular pressure bearing member 92 moves to the left under the bias of the spring 93 until it abuts against the stopper 91c and stops. The fluid communication hole 91d is now closed by the bottomed tubular pressure bearing member 92, stopping oil from being discharged from the relief valve 90 in the oil filter supply oil passage 110.

The oil discharged from the relief valve 90 is delivered to a predetermined relief-side lubricating region 140 in the power unit 1. A relief oil passage 130 through which relief oil flows and the flow of relief oil will be described below.

The oil pump cover oil passage 131 held in fluid communication with the discharge port 91g of the relief valve 90 is oriented obliquely leftwardly and upwardly as viewed in right-hand side elevation, as will be noted from FIG. 17. As shown in FIG. 15, the oil pump cover oil passage 131 has a downstream end held in fluid communication with a right crankcase member oil passage 132 defined in the right crankcase member 3.

As will be noted from FIG. 15, the shift fork of the transmission M is slidably supported by a tubular shift fork shaft 63 (see FIG. 15) disposed in the right and left crankcase members 3 and 4 and supported by bosses 3j and 4j provided in the right and left crankcase members 3 and 4, respectively. The tubular shift fork shaft 63 defines therein a shift fork oil passage 133 having right and left ends held in fluid communication respectively with the right crankcase member oil passage 132 that is open into the boss 3j and a first left crankcase member oil passage 134 that is open into the boss 4j of the left crankcase member 4.

As shown in FIGS. 1 and 15, the left crankcase member 4 has a clutch lifter lever shaft insertion hole 4k defined therein for insertion of the clutch lifter lever shaft 95 therein. The clutch lifter lever shaft 95 is formed therein a clutch lifter lever shaft oil passage 135 and has an open lower end which makes the clutch lifter lever shaft oil passage 135 in fluid communication with the first left crankcase member oil passage 134.

The clutch lifter lever shaft 95 has a first opening 95a formed in a lower portion thereof for engagement with the push rod 96 inserted in the main shaft 31. When the clutch lifter lever shaft 95 is angularly moved about its own axis, the push rod 96 is axially moved toward the clutch device C, disengaging the clutch device C.

The main shaft 31 has a push rod insertion hole 31c defined axially therein for receiving the push rod 96 therein. A clearance is defined between the wall of the main shaft 31 that defines the push rod insertion hole 31c and the outer surface of the push rod 96. The main shaft 31 has a plurality of gear supply oil passages 31d defined therein which extend between the clearance and the gears of the main gear train g1 on the main shaft 31. The clearance and the gear supply oil passages 31d jointly serve as a main shaft oil passage 136.

Figure 16:
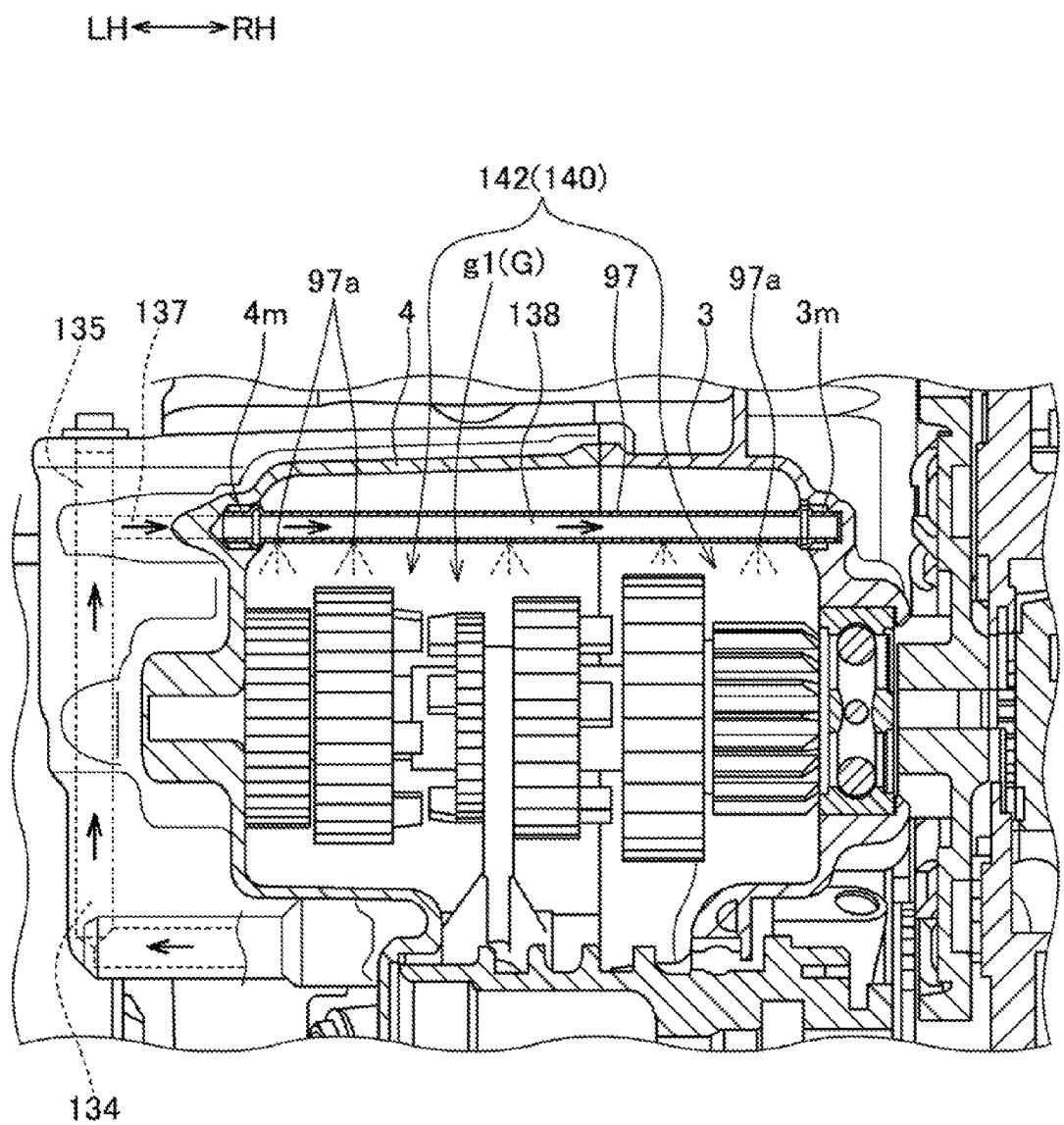
FIG. 16 is a rear elevational view of the power unit, partly taken along a plane extending through the axis of the main shaft and the axis of a transmission jet pipe.

A second opening 95b is formed in an upper portion of the clutch lifter lever shaft 95. As shown in FIG. 16, a tubular transmission jet pipe 97 for ejecting jet oil toward the transmission gear train G is supported by bosses 3m and 4m provided in the right and left crankcase members 3 and 4. The tubular transmission jet pipe 97 has a plurality of oil ejection ports 97a for ejecting a mist of oil.

The relief oil passage 130 is constructed as described above. As shown in FIG. 17, oil discharged from the relief valve 90 flows successively through the oil pump cover oil passage 131, the right crankcase member oil passage 132, the shift fork oil passage 133, the first left crankcase member oil passage 134, the clutch lifter lever shaft oil passage 135, and the main shaft oil passage 136, and is then supplied to transmission gear shaft lubricating regions 141 (see FIG. 15) including sliding portions 31e and splined portions 31f between the main shaft 31 and the transmission gears of the main gear train g1.

Oil in the clutch lifter lever shaft oil passage 135 flows through a left crankcase member oil passage 137 and a transmission jet pipe oil passage 138, and is ejected, as shown in FIG. 16, from the oil ejection ports 97a of the transmission jet pipe 97 to the transmission gear train lubricating regions 142 of the transmission gear train G.

Of the lubricating regions 124 and 140 in the power unit 1, the feed-side lubricating region 124 is supplied with oil delivered from the oil filter 80 through the feed oil passage 115. The relief-side lubricating region 140, which is different from the feed-side lubricating region 124, is supplied with oil from the relief valve 90 through the relief oil passage 130. The relief oil passage 130 is in fluid communication with the clutch lifter lever shaft oil passage 135 formed as a drive shaft oil passage in the clutch lifter lever shaft 95 that serves as a drive shaft extending transversely to the crankshaft axis L2. Since part of the relief oil passage 130 that delivers oil to the relief-side lubricating region 140 different from the feed-side lubricating region 124 includes the clutch lifter lever shaft oil passage 135 formed in the clutch lifter lever shaft 95, the oil passage and the drive shaft are shared to simplify the oil passage system.

According to the present embodiment, the shift fork oil passage 133 in the tubular shift fork shaft 63 is used as part of the relief oil passage 130 that delivers oil to the transmission gear shaft lubricating regions 141 and the relief-side lubricating region 140 as transmission gear train lubricating regions 142. However, the shift fork oil passage 133 may be used as part of the oil passage for delivering oil to the feed-side lubricating region 124 between the crankshaft 30 and the connecting rod 13 or may also be used as part of other oil passage.

The power unit 1 according to the present embodiment is constructed as described above and offers the following advantages.

In the power unit 1, as shown in FIGS. 1 and 3, the oil filter 80 including the tubular layered filter paper body 83, partly overlaps the electric power generator 65 as viewed in the direction of the crankshaft axis L2, and is positioned between the electric power generator 65 and the crank weights 30e with respect to the direction of the crankshaft axis L2. Further, the filter mount axis L3 forms an acute angle to the crankshaft axis L2. Therefore, the layout of parts between the electric power generator 65 and the oil filter 80 is made compact, and the crankcase 2 is prevented from bulging outwardly, making the power unit 1 reduced in size in its entirety.

The oil filter 80 includes the replaceable filter element 82 that includes the tubular layered filter paper body 83 and the plate-like members 84 and 85 covering the respective opposite ends of the tubular layered filter paper body 83. Of the plate-like members 84 and 85, the plate-like member 84 which is positioned closer to the left crankcase member 4 has the circular oil outlet 84b defined centrally therein. The left crankcase member 4 includes the filter casing mounting seat 4d and the oil passage seat 4e positioned inside the filter casing mounting seat 4d. The oil filter casing 81 that covers the replaceable filter element 82 is provided with the spring 87 for normally pressing the replaceable filter element 82 against the crankcase 2 and holding the replaceable filter element 82 in place. The oil filter casing 81 is fastened to the left crankcase member 4 by the bolts 88 disposed around the oil filter casing 81. Therefore, the oil filter 80 can include an inexpensive replaceable filter element 82, and hence is reduced in cost, and can be assembled and maintained with ease.

As shown in FIGS. 1 and 11, the oil filter casing 81 is disposed so that the oil filter casing 81 and the generator cover 66 that covers the electric power generator 65 partly overlap each other as viewed in the direction of the crankshaft axis L2, and the generator cover 66 has the recess 66d for clearing the oil filter 80. Therefore, the oil filter 80 and the electric power generator 65 can be disposed closely to each other, and any oil leakage and seepage from the oil filter casing 81 can easily be confirmed for better maintenance and inspection.

The bolts 88 that fasten the oil filter casing to the left crankcase member 4 underlie and are located behind the generator cover 66 as viewed along the crankshaft axis L2. The bolts 88 covered with the generator cover 66 are thus prevented from being dislodged.

As shown in FIG. 3, the oil filter 80 is disposed obliquely with respect to the crankshaft axis L2 so as to be positioned inside of the line L4 that interconnects the outer edge 66e of the generator cover 66 and the outer side edge 102a of the oil reservoir 102 in the lower portion of the crankcase 2. Therefore, the oil filter 80 is prevented from adversely affecting the banking angle of the motorcycle, not shown, on which the power unit 1 is mounted, and the banking angle can be increased.

The power unit 1 is provided with the transmission gear shafts 33 including the crankshaft 30, the main shaft 31 parallel to the crankshaft 30, and the countershaft 32 parallel to the crankshaft 30, the clutch device C on one end of the main shaft 31, and the clutch lifter lever shaft 95 on the other end of the main shaft 31 for engaging and disengaging the clutch device C. The oil filter 80 is disposed below the clutch lifter lever shaft 95, and the oil strainer 68 through which oil flows from the oil reservoir 102 to be drawn into the feed pump 72 is disposed below the oil filter 80, the oil strainer being disposed adjacent to the oil filter 80. Consequently, it is possible for the clutch lifter lever shaft 95 to be placed in a space behind the electric power generator 65, for the oil filter 80 to be placed below the clutch lifter lever shaft 95, and for the oil strainer 68, through which oil flows from the oil reservoir 102 into the feed pump 72, to be disposed below the oil filter 80. The oil reservoir 102 where the oil strainer 68 is disposed can be placed in a high position, ensuring a minimum height from the ground for the vehicle.

Although the embodiment of the present invention has been described above, the present invention is not limited to the above embodiment, but various changes and modifications can be made therein. The power unit 1 according to the present invention is not limited to use on the motorcycle, but may be incorporated in other kinds of saddle-type vehicles.

DESCRIPTION OF REFERENCE SYMBOLS

1 . . . Power unit, 2 . . . Crankcase 3 . . . Right crankcase member, 4 . . . Left crankcase member, 4d . . . Filter casing mounting seat, 4e . . . Oil passage seat, 8 . . . Right crankcase cover, 30 . . . Crankshaft, 30e . . . Crank weight, 31 . . . Main shaft, 32 . . . Countershaft, 33 . . . Transmission gear shaft, 40 . . . Drive gear, 63 . . . Shift fork shaft, 65 . . . Electric power generator, 66 . . . Generator cover, 66e . . . Outer edge, 68 . . . Oil strainer, 80 . . . Oil filter, 81 . . . Oil filter casing, 82 . . . Replaceable filter element, 83 . . . Tubular layered filter paper body, 84 . . . Plate-like member, 84b . . . Oil outlet, 85 . . . Plate-like member, 87 . . . Spring, 88 . . . Bolt, 90 . . . Relief valve, 95 . . . Clutch lifter lever shaft, 100 . . . Crankshaft chamber, 101 . . . Transmission chamber, 102 . . . Oil reservoir, 110 . . . Oil filter supply oil passage, 115 . . . Feed oil passage, C . . . Clutch device, E . . . Internal combustion engine, L1 . . . Cylinder axis, L2 . . . Crankshaft axis, L3 . . . Filter mount axis, L4 . . . Line interconnecting an outer edge of the generator cover and an outer side edge of the oil reservoir

The invention claimed is:

1. A power unit including an internal combustion engine having a crankshaft with a crank weight, an electric power generator mounted on an end of the crankshaft, a power transmitting member mounted on another end of the crankshaft, for outputting power from the crankshaft, and a lubricant oil filter; wherein:

the oil filter includes an oil filter casing and a tubular layered filter body in the oil filter casing, the oil filter partly overlapping the electric power generator as viewed in a direction along an axis of the crankshaft and being positioned between the electric power generator and the crank weight on the crankshaft with respect to the direction along the axis of the crankshaft; and the oil filter is disposed to have a filter mount axis forming an acute angle to the axis of the crankshaft.

2. The power unit according to claim 1, wherein the oil filter includes a replaceable filter element having a pair of plate-like members covering respective opposite ends of the tubular layered filter body;

one of the plate-like members has an oil outlet formed centrally therein;

the internal combustion engine has a crankcase formed with a filter casing mounting seat and an oil passage seat inside the filter casing mounting seat; and a spring is interposed between the oil filter casing and the replaceable filter element, for normally urging the replaceable filter element to be pressed against the crankcase and held in position on the crankcase, the oil filter casing being fastened to the filter casing mounting seat of the crankcase by fasteners disposed around the oil filter casing.

3. The power unit according to claim 2, wherein the electric power generator has a generator cover;

the oil filter casing is disposed such that the oil filter casing and the generator cover covering the electric power generator partly overlap each other as viewed in the direction along the axis of the crankshaft; and the generator cover has a recess formed therein to clear the oil filter.

4. The power unit according to claim 3, wherein the fasteners by which the oil filter casing and the crankcase are fastened to each other underlie the generator cover and are behind the generator cover, as viewed in the direction of the axis of the crankshaft.

5. The power unit according to claim 3, the oil filter casing is so disposed obliquely with respect to the axis of the crankshaft as to be positioned above a line interconnecting an outer edge of the generator cover and an outer side edge of a lower portion of the crankcase.

6. The power unit according to claim 5, wherein the power unit has transmission gear shafts including a main shaft and a countershaft both extending parallel to the crankshaft, a clutch device mounted on an end of the main shaft, and a clutch lifter lever shaft operable on another end of the main shaft for engaging and disengaging the clutch device;

the oil filter is disposed below the clutch lifer lever shaft; and an oil strainer for cleaning oil to be sent to an oil pump is disposed below and adjacent to the oil filter.

* * * * *